United States Patent [19]
Thorner

[11] 3,989,391
[45] Nov. 2, 1976

[54] CAR-WASH DEVICE

[76] Inventor: Robert H. Thorner, 32237 Willoughby, Farmington Hills, Mich. 48024

[22] Filed: Feb. 10, 1975

[21] Appl. No.: 548,397

Related U.S. Application Data

[63] Continuation of Ser. No. 326,964, Jan. 26, 1973, abandoned.

[52] U.S. Cl. ................................ 401/43; 15/24; 15/29; 239/310
[51] Int. Cl.² ........................................ A46B 11/06
[58] Field of Search ........................... 401/40–43, 401/136–139, 46; 15/24, 29, 22, 97; 239/310; 222/386.5

[56] References Cited
UNITED STATES PATENTS

| | | | |
|---|---|---|---|
| 1,219,296 | 3/1917 | Hahn | 401/136 |
| 1,560,973 | 11/1925 | Cheron | 401/136 |
| 2,063,430 | 12/1936 | Graser | 222/386.5 |
| 2,673,999 | 4/1954 | Shey | 401/41 X |
| 2,742,323 | 4/1956 | Shey | 401/40 X |
| 2,793,379 | 5/1957 | Moore | 401/46 |
| 2,795,460 | 6/1957 | Bletcher | 239/310 X |
| 3,283,352 | 11/1966 | Hu | 15/22 |
| 3,361,300 | 1/1968 | Kaplan | 239/310 X |
| 3,409,924 | 11/1968 | Slama | 15/24 |
| 3,624,854 | 12/1971 | Strong | 15/97 |

*Primary Examiner*—Lawrence Charles

[57] ABSTRACT

The main disclosure herein relates to a manually-operated washing device, particularly but not necessarily for automative vehicles, which includes an attachable portion that can be quickly clamped to the wand of a coin-operated car-wash unit for enabling a car-owner to wash his car manually in a unique procedure in less than ten minutes with all dirt removed and the least scratching of any wash. The car-wash device includes novel clamping mechanism and other means to enable quick attachment of the attachable portion to the wand while accommodating almost all shapes thereof now in service. A separate garden-hose wand can be included in the device, so the attachable portion can be clamped thereto for performing the fast but excellent car-wash at home (at no cost) exactly as at the coin-wash. In addition, the car-wash device includes a unique pressure-injection soap-supply system which does not interfere in any way with the quick attachment of the wand at the coin or home wash, and operates at very low pressure to permit large soap orifices.

50 Claims, 17 Drawing Figures

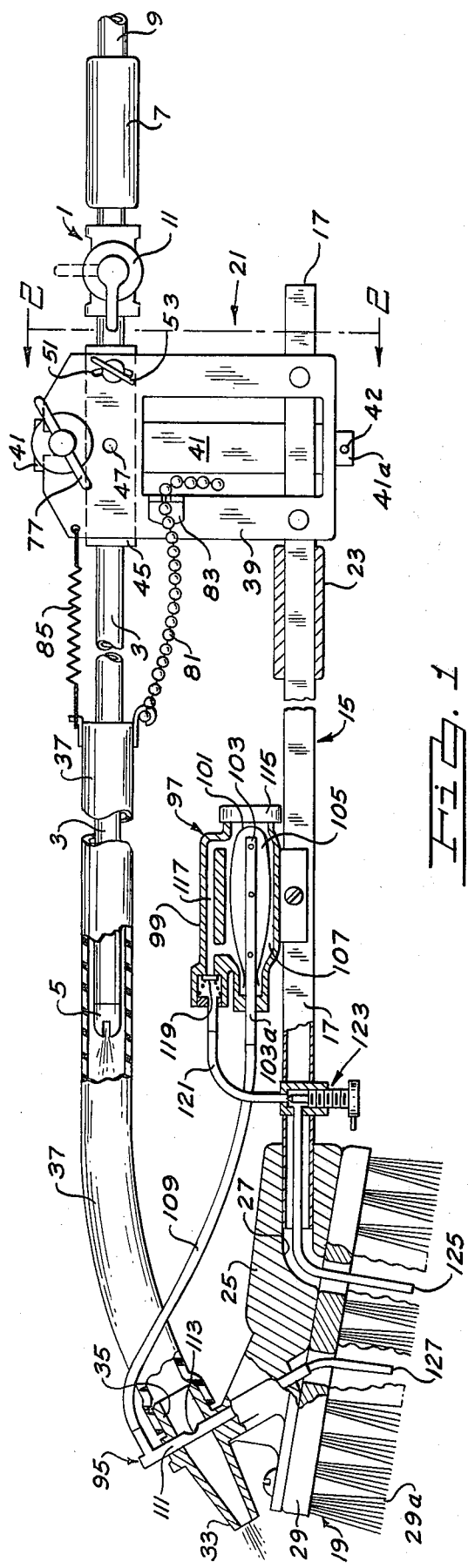
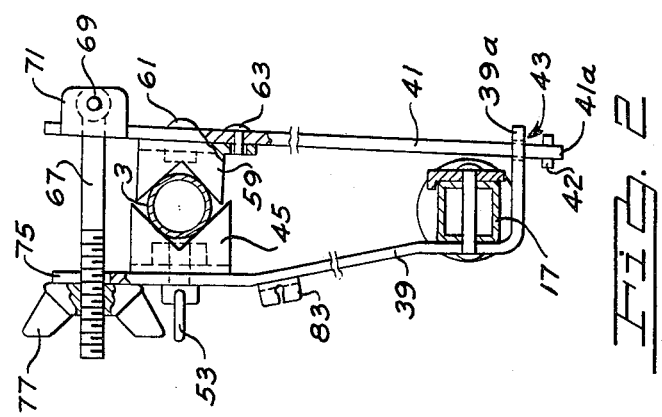
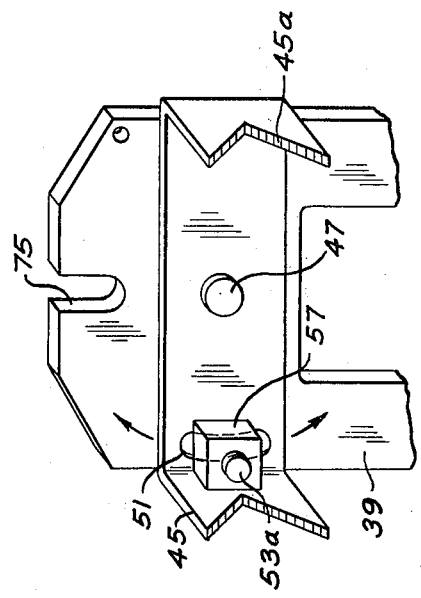
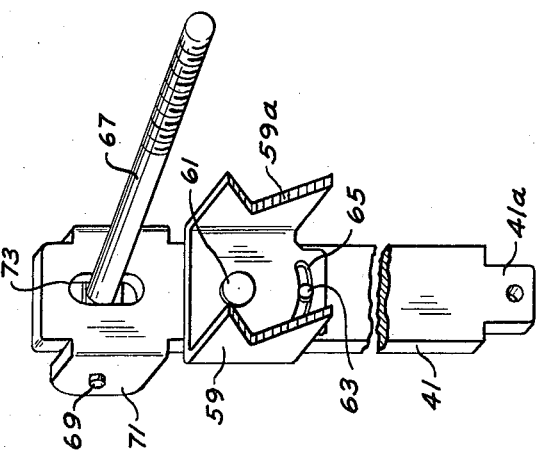

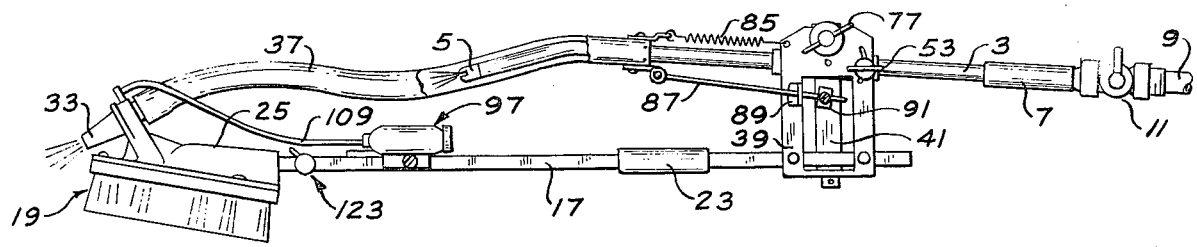
Fig. 5
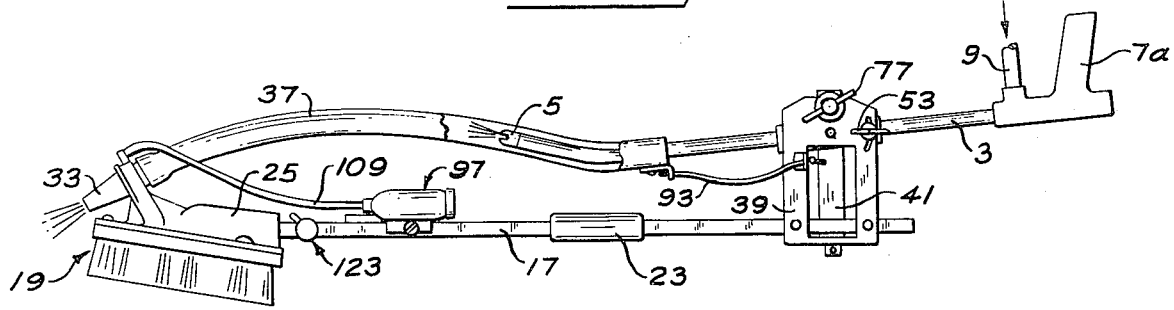
Fig. 6
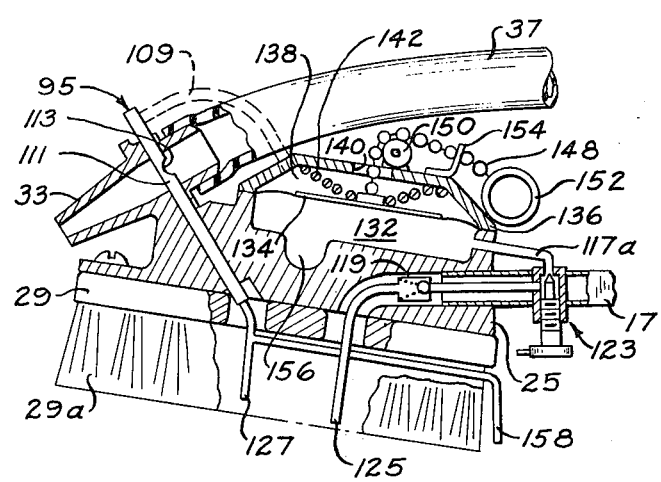
Fig. 8
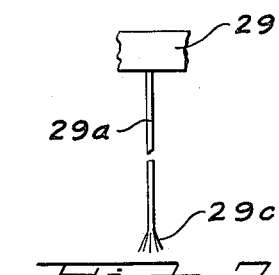
Fig. 7
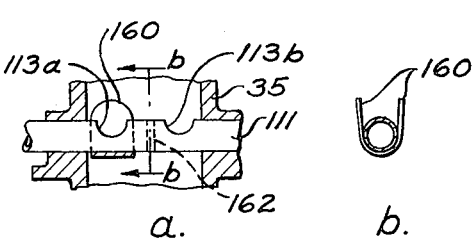
Fig. 9
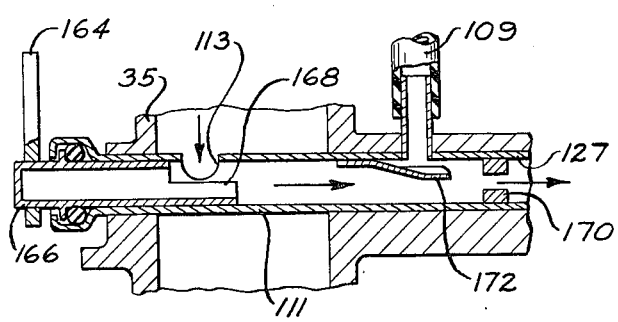
Fig. 10
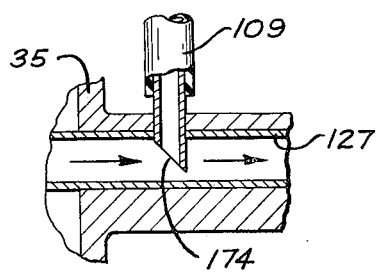
Fig. 11 a.    b.

CAR-WASH DEVICE

This application is a continuation of Ser. No. 326,964, Filed Jan. 26, 1973, now abandoned.

BACKGROUND OF THE INVENTION

In order to understand the great utility of the car-wash device of the present invention, it is first necessary to consider a thorough discussion of all types of present car-washes, and why they fail to provide the desired ideal car-wash. The many objections to all known car washes cause a dilemma for millions of car-owners who cannot at the present time get this desired but elusive ideal wash.

Before proceeding with this comprehensive discussion, the characteristics of the desired car-wash should first be defined. An "ideal" wash would perform the following:

1. Clean the car completely, by removing all dirt and/or "road film" in all circumstances.
2. Minimize paint-scratching, to be the same or less than for the best present wash (such as a so-called "hand-wash").
3. Clean the car fast, in not more than 7 to 10 minutes.
4. Clean the car at low-cost when a paid-wash is used, such as 50–95 cents depending on car size, and preferably a lower cost for a small car than for a large car.

After many years and hundreds of millions of dollars for development, not one car-wash system presently known can provide the ideal car-wash specified above. The car-wash device and system of the present invention does provide this ideal car-wash.

The various car-wash systems, and the reasons why they fail to provide all the desired characteristics specified above will be considered after discussing the main steps or operations necessary in washing all cars having road film on their surfaces, as follows:

Water Run-off

The frequently-used term road film refers to grime or dirt-mass adhering to a car-surface caused by a combination of atmospheric precipitation mixed with small amounts of road impurities, such as oil deposits, rubber, etc. which are splashed on car-surfaces from the tires of other cars. The impurities tend to bind the dirt and adhere to the car surfaces. However, a large portion of the dirt-mass is loose enough to be initially run off without scratching paint by a stream of water, particularly when discharged at high velocity, such as from a wand-nozzle in a self-operated coin-wash. I believe that the large initial dirt run-off by water is caused mostly by the large mass of the water striking the dirt particles at high velocity, and then floating this loose dirt off the car surface. Hence, this portion of the car-washing process will be referred to herein as "hydraulic" cleaning. While soap may be included to help this initial dirt removal, tests to date indicate that the effect of soap is secondary and not essential in this step, except in a few special conditions to be discussed.

When a previously cleaned car is covered with only dust, for example when deposited during a few days free of atmospheric precipitation, the car can be completely cleaned by this water run-off alone without further soap and/or brushing. The car can then air-dry if desired. Dust or dirt that falls on a car without road-film frequently does not adhere to the car-surface. Tests have shown that a dusty car parked in a rain shower will often be nearly clean when it dries; a coating of only dust very often will be run-off by the rain to clean the car. Also a previously-clean car frequently will remain substantially clean after a rain shower.

Washing Operation

After completing the water run-off operation on a car having road-film, the remaining thin dirt-film must be removed by physical contact, such as by a sponge or brush with a proper amount of water and detergent to loosen this dirt-film. The amount of water necessary for this operation is very small, much less than for the initial dirt run-off by water.

Rinsing Operation

Before the water-soap mixture of the washing operation dries, a spray of water is applied to the entire car-surface by suitable spray means to run-off the loosened dirt and soap.

Drying Operation

In commercial car washes, drying is done by hand and/or by blowers. These washes use very strong soaps which tend to leave spots if the car is air-dried. However if certain mild soaps are used in the washing process, the car-surface can air-dry in the same manner as for dish-washing substantially without soap-spots.

Now consider the various types of car-washing systems in order of cost and why they fail to provide the desired total ideal characteristics specified above.

Hand-wash

For a hand wash, the stationary car is cleaned by one or more persons with a container of soapy water using a sponge or brush manually. This was frequently done at gas stations in the past, but has become too expensive for most car-owners. But if properly done, this car-wash method does not cause excessive paint-scratching.

Production Car-Washes

This class of car-wash includes a production-line which pulls the car through automatically. The car-wash operations are performed at various stations by automatic machines and/or by workers. Most present car-washes of this type must employ a series of large rotating or whirling brushes to clean most or all of the car exterior. In the automatic type known as exterior "drive-through" washes, the driver remains in the car and only the exterior is cleaned at a present cost of about $1.50. In a second type, known as a "full-service" or semi-automatic car wash, workers are employed to clean both the interior and exterior at a present cost of about $2.00 to $2.50 per wash.

While the car can be cleaned in 8–10 minutes in a complete car wash and about 2–3 minutes in a drive-through car-wash, they both have several inherent problems. The first is the relatively high cost, especially for the complete wash. In many areas of the nation there are very few days without atmospheric precipitation. In the northern cities where salt is used on the streets, as well as cities near salt water, cars should be washed very often. Hence, complete production wash systems have become too costly for millions of car-owners. It is significant that the cost of a production-wash is the same for a Pinto as for a Lincoln.

Both types of production car-wash systems have another inherent and important problem. Since the shape of each car as well as the amount of dirt thereon cannot be predicted, all production car-wash systems must be designed to wash every square inch of every car as though it were the dirtiest portion of the dirtiest car—even though a car is not very dirty but needs washing.

Hence, these two production car-washes inherently cause needless extra paint-scratching, and many people have rejected production-washes for this reason alone and seek a better solution. This scratching or "hazing" is worst when a rotating brush holds sand or grit from one car and then scratches the following cars.

A fourth problem with production washes is that the cars must be cleaned very fast; and since it must be assumed that every car is the dirtiest car, very strong soaps (and an excessive amount thereof) must be used to loosen the road-film chemically as well as by brushes. Tests of production car-wash soaps show that the best car-wax is almost completely removed in the first car-wash after waxing, whereas the wax is not removed by milder soaps, to be discussed further herein.

Still another frequent objection to production-washes is that projecting accessories, such as a radio antennae, sometimes are damaged by the whirling brushes; also, portions of the car are missed by the brushes.

Self-Operated Coin-Wash

Because of the problems discussed above, this type of car-wash (hereinafter referred to only as "coin" or "wand" wash) has gained widespread acceptance because of the "do-it-yourself" factor. Also, coin-washes are open at most hours when other types of car-washes are closed, and hence are very convenient. In a coin-wash the car is parked in a bay or stall and is sprayed manually by an operator (usually the car-owner) with a wand discharging selectively either water or a mixture of soap and water under high pressure (about 500-700 psi, or even higher). The clear or soapy water is supplied only for metered periods, presently about 4-5 minutes for 35 cents inserted in a coin-slot, and the supply of liquid is then shut off automatically until additional coins are inserted in the coin slot. The dirt and film are supposedly removed entirely by the chemical action of a very strong detergent without physical contact on the car surface by a brush, sponge, etc. The car is first sprayed completely with soapy water to combine the run-off and washing operations. The car is then rinsed with clear water. Two coin-periods are usually used for a large Ford when very dirty. This washing method is included in a class known as "jet washers", in which no physical contact is made on the car surface by a brush or sponge.

The most serious and frequent complaint against coin-washes when operated solely as discussed above, is that a thin layer of road-film remains on the car and cannot be removed by this process without further work on the car-surface by a brush, sponge, towel, etc. This is true of all so-called jet-washers including an automatic version thereof, in which soap and water is sprayed on the car automatically. Despite this serious disadvantage, as a lesser of evils the coin-wash has become widely used, frequently as an interim wash because of the residual road-film.

Many other people have tried coin-washes as well as other jet washes, and have rejected this form of car-washing solely because of the residual dirt-film.

However, the conventional coin-wash operation can provide a satisfactory car-wash if only dust resides on the car surface as a result of zero precipitation between car-washes. In fact tests have shown that water alone will run off all the dust coating (without soap or rinse) in less than four minutes, and the car is then clean. In some areas of the country where rainfall is not heavy, this mode is satisfactory.

When the car is covered by road-film, several other methods are now used often at coin-washes to clean a car satisfactorily. In a first method after the car is "washed" as above-described, the car is driven out of the bay-area to a wiping area usually provided for this purpose. The car-owner then wipes off the remaining water and dirt-film, and the car appears clean. However there are problems in this method. In the process of wiping off the remaining film, the paint is scratched somewhat by the slight dirt in the film. Even worse, if a breeze exists and/or the sun is bright, the rinse-water dries before the wiping process is completed which increases the paint-scratching. Also, it is very unpleasant both on hot days in the sun as well as on cold and/or windy days in fall and winter.

But the worst disadvantage of the foregoing procedure is the excessive time. It requires about eight minutes in the bay area, about three minutes to move the car and get out the towels, about 10-20 minutes to clean and dry the entire surface, or a total of about 20-30 minutes for the entire car-wash plus the time to squeeze out the cleaning cloths. Equally bad, this procedure requires hard work for the entire period.

In a second method which is frequently used at coin-washes, the car-owner brings a container of water-detergent mixture at "off-hours" when no other cars are waiting. The entire car is first sprayed with or without soap to run off the loose dirt in a first coin-period. Then the car is completely washed by hand using a sponge or brush soaked in the container of soapy water. Next, the car is rinsed with clear water in a second coin-period and finally the windows are wiped with a squeegee. Since the car is then clean if the proper soap is used it will air-dry in the same manner as for dish-washing with negligible soap spots. This method produces a good wash and is similar to the "hand wash" formerly available at many gas stations. The disadvantage is the large amount of time required and the back-breaking work. In many timed tests of this method on a large Ford-size car, over 30 minutes are required at the coin-wash; another 15 minutes are needed to prepare the soapy water in the container and for clean-up afterwards, so the total time is about 45 minutes. Despite this objection, many people are now using this method at coin-washes because it produces an excellent wash with minimum paint-scratching. In fact it is so common that signs are posted at most coin-washes warning that this method is not permitted in the bay area if cars are waiting.

Home Wash

There are several types of home-washes presently used. The simplest is to use a garden-hose and a bucket filled with soapy-water. After running off the loose dirt initially with water from the garden-hose nozzle, a sponge soaked in soapy-water is used to clean the entire car. Then the car is rinsed with water and air-dried or wiped dry by hand. While this method produces a satisfactory car-wash, the time and hard work are objectionable to millions of car-owners. Also the water pressure is too low for proper initial run-off if the car is very dirty.

In order to reduce the time and work involved in home-washes, numerous car-wash devices are now available and comprise several types.

1. The "jet-type" of home car-wash is similar to the jet-washer at coin-washes and has the same disadvantages, but is less effective because of the lower pressure (35 psi). The jet-washer does not include a brush but comprises a manually-operated wand with a discharge jet and a valve-controlled soap supply which selectively can be turned on or off. The car is first washed with a mixture of a strong detergent and water, and is then rinsed with water. The cleaning is dependent entirely on the chemical action of the strong soap to remove road-film. While it might clean off a covering of dust or light dirt, this type of wash leaves a dirt-film residue when a heavy road-film is present.

2. The "fountain-brush-type" home car-wash usually includes a soap-unit for selectively supplying soapy-water to the brush for washing the car. Then the soap is turned off so only water is discharged at the brush area. As usually constructed, this type of wash has several fundamental disadvantages. For example, there is no provision for a high-velocity jet-stream of water to hydraulically run-off a large portion of the dirt before using the brush to clean only the remaining dirt-film. When the brush is applied directly to a heavy coating of dirt without initial water run-off, needless paint-scratching occurs. Equally objectionable, it is difficult to run-off the loose dirt and soap by using rinse-water while the brush is in the way. Also, much time is wasted because the washing and rinsing operations must be done separately.

In both types of home-washers the method of dispersing soap is particularly objectionable, and seriously detracts from their usefulness. Solutions to the puzzling problems related to soap-supply systems have been very elusive. One problem in dispensing soap is the difficulty of producing a proper amount of soap without waste while still cleaning the car. Fluid-venturis have been used but are expensive. Hydraulic means are more common, but only very small restrictions can be used to meter soap-flow because of the relatively high pressure (35–90 psi) of the water directed through a container of soap which then flows back into the main water stream. Tests of several home-washers indicate that this system is extremely wasteful of soap and adds time to the car-wash. One fountain washer required 23 cents worth of soap per wash, which quickly diluted excessively with water; the dilution was so bad that the soap-container had to be emptied and refilled before each car-wash, which required 10 minutes extra.

Equally objectionable, particularly with jet-washers, is the reduction in the chemical cleaning effect (which is poor to begin with) as the soap is quickly diluted.

These problems are caused by fundamental characteristics in the hydraulics of home-washers, and are basic and inherent. The water-pressure for garden-hoses varies depending on many conditions but may average 35 psi and can be as high as 100 psi. This relatively high pressure is a source of a special soap-supply problem, as mentioned above. In order to restrict the flow of soap to acceptable limits with this relatively high-pressure, the metering orifices in the soap units must be very small. Any minute particles of dirt can plug these small holes to reduce or stop the soap-supply. The problem is compounded by the requirement for a low-cost and light-weight construction, usually of plastic. The plastic walls of the soap reservoir must be strong enough to contain this relatively high pressure without leaks. If the reservoir is sealed permanently except for the filler cap as is often done, the small orifices cannot be cleaned.

The soap-supply problem in home washers is so severe that solid soap-cartridges or pellets have been used in the water passage to dissolve the soap at a predetermined rate at all times. However, with these soap cartridges there is no way to turn off the soap-supply, wherein the rinse must be performed separately by a garden hose alone.

Home-wash devices cannot be used by people who live in apartments, or otherwise have no areas available to use garden-hoses. Also, in the northern cities garden-hoses cannot be used during the winter.

Now that the types of car-washes have been described, several terms used herein should be defined. The term "car" refers to any automotive or self-propelled vehicle; although it refers particularly to automobiles, station wagons, trucks, and buses, the term may also include motorcycles, airplanes, boats, etc.

The term "wand" refers to the manually-operated portion of coin-washes (or for garden-hoses) usually comprising a metal tube connected to a high-pressure water-hose, and includes a handle-portion to be held by the operator and a jet or orifice at the end of the tube to discharge water at high velocity particularly at coin-washes. The handle may be straight or a pistol grip, either type being part of the "wand means."

The term "soap" refers to any kind of cleaning agent or fluid or detergent, particularly for car-washing, which usually (but not necessarily) is a liquid for the device of the present invention.

The term "metered time" applies only to coin-washes and refers to the total time in which water and soap is supplied for a given coin inserted in the coin-box.

The term, "brushing means" unless otherwise specified, refers to any kind of brush, sponge, cloth, mit or similar means to enable manual cleaning of the car-surface by physical contact, usually accompanied by soap.

The term "road-film" refers to organic matter such as oil, oxidized oil, rubber, asphalt, grease, insect remains, quartz, mica and clay. The organic constituents seem to act as a binder to hold the matter together and adhere to the car-surface making the film difficult to remove.

The term "dirt" as used herein broadly refers to any foreign matter to be be removed such as grit, sand, etc., as well as film. Most of the dirt (that does not have a binder) can be removed hydraulically, especially by high-pressure water as described herein, whereas road-film must be removed by physical contact. For purposes herein, the term dirt refers to all foreign matter including road-film unless otherwise specified.

Since an important aspect of my invention is to enhance do-it-yourself coin-washes, in addition to all the foregoing it is important to understand the extremely useful characteristics of all coin-washes which are very significant in the present invention. Coin-washes usually include a covered bay area, but some versions at gas stations merely comprise an open washing-area with a hose having a wand strung out on the deck of this area.

Tests have shown that the particular spray design with the high pressure of a coin-wash is the best for the initial water run-off operation to remove mot of the dirt particles hydraulically without scratching. This is particularly useful when sand or salt must be removed from the car-surface. The pressure is much higher (500–700 psi) than for a wand or spray nozzle attached to a garden hose (35 psi), and the particular jet-design utilizes the higher pressure to provide for a wide spray with a water "knife-edge" at sufficient velocity when selectively held by the operator at the optimum distance from the surface at all times to run off most of the dirt particles hydraulically without harming the paint. Garden-hose nozzles do not produce as good a spray because of their lower pressures, so that the high-pressure coin-wash has particular utility, especially in Class III, IV, and V car-washes, to be discussed. The coin-wash enables the best initial water run-off operation of any car-wash system.

In addition, by manual selective use, the wands at high-pressure coin-washes can perform several unique tasks in car-cleaning when held at varying distances for each task. Both black and white-wall portions of tires can be hydraulically cleaned by the water-blast by holding the jet a few inches from the tire surface and running the jet-discharge around the tire; this action does no harm during the life of the tire. It is especially effective after a good tire-cleaner is used every 4–6 weeks.

The wands for home jet-washers with garden hoses can perform most of these operations, but not as effectively. For initial water run-off the wand must be held closer to the surface than at coin-washes because of the lower pressure.

Most coin-washes can be used at any time, even after production washes are closed. In winter many coin-washes are provided with a heater and either a single large door or tarpaulin to close off the wind; also the water supply is usually heated in winter.

Another inherent advantage of coin-washes is that the operator usually is the car-owner who will be more careful of his own property than car-wash employees.

The great utility of the present invention can be better understood by classifying the conditions of a car-surface in the degree of difficulty for removing foreign matter such as dust, dirt, mud, sand, salt, grime, etc., as follows:

Class I

In this class, the car-surface would be covered only with dust as a result of zero precipitation since the latest car-wash. No dirt-film would be present on the surface.

Class II

In this class, the car-surface would be coated with dust as in Class I, but some rain falls on the surface while the car is parked and the pavement dries before the car is driven, so the surfaces would not be splashed by the tires of other cars.

Class III

In this class, the car would be driven during a light rain to produce a thin coating of road-film on the car-surfaces thrown from the tires of other cars.

Class IV

In this class, the car would be driven during a heavier rain and with at least moderate traffic to produce a thicker coating of road-film on the car-surfaces. The coating increases as the speed increases and as the number of other cars increases to throw more road-dirt and grime on the car-surface.

Class V

This is the worst condition for car-washing. In this class, a number of factors may be present. For example, in northern cities in winter the car would be driven in a snow-condition with the streets covered with salt in heavy traffic to cause severe splashing; this is particularly bad if the car has not been washed for long periods wherein the salt-dirt mass accumulates on the car-surface. In cities adjacent to large bodies of salt water, the car-surface also can acquire a heavy salt-coating in normal driving. This class of car-wash would also apply to a car normally driven in less severe conditions, as in Class IV, but for extremely long periods without washing, which enables a thick coating of road-film to accumulate.

The coin-wash can perform a Class I and possibly Class II wash as intended without physical contact by a sponge or brush. But all remaining classes of car-wash require physical contact to remove road-film.

The car-wash device of the present invention utilizes several factors to produce an excellent car-wash. The first factor is the principle of air-drying in the same manner as for dish-washing. With the proper soap, if the car-surface is perfectly cleaned and rinsed of soap like dishes it will dry sparkling clean substantially free of soap-spots without manually drying the surface. Tests have shown that some soaps are much better than others in providing a sparkling air-dried surface wherein the soap-spots are negligible.

Another important factor is the unique and inherently useful characteristic of the high-pressure jet-spray wand particularly at coin-washes as discussed above, but also for jet-spray wands designed for garden hoses. My car-wash device enhances all the desirable factors of a jet-spray wand, as at coin-washes, while eliminating all the objectionable factors previously discussed.

The wand enables running off most of the dirt hydraulically during the water-run-off operation (by pressure up to 850 psi), so the washing operation must remove only the fine remaining dirt particles and residue film. Another important factor is the present economic inflation which has caused a large trend toward "do-it-yourself" in many aspects of our society. More automotive test instruments are now being sold for personal use than ever. For car-washing, particularly when people now own two or more cars, for cost alone the trend is toward do-it-yourself methods. But the puzzling problem has been that no present do-it-yourself car-wash method provides the ideal car-wash as defined above.

A main object of the present invention is to provide a manual car-wash system and device including mechanism which can be quickly attached (and removed) to most existing wands of present coin-washes to overcome all the above-discussed problems and enables a complete and excellent do-it-yourself car-wash in a very short time and hence at low-cost with a minimum of work, and further to enable a mode of operation in which the device causes the least paint-scratching of any known car-wash system.

Another object of the present invention is to provide a manual car-wash system and device as described in the preceding paragraph which in addition includes wand means to enable use with garden hoses for providing substantially the same excellent car-wash at home in the same manner as at coin-washes for Class I–III dirt formations.

An additional object of the present invention is to provide a manual car-wash system and device as described in either or both preceding paragraphs, which includes novel attachable means to enable very quick attachment (and removal) of the device to the wand, and may also include unique means to adjust quickly for any wand-angle as well as other related means to accommodate almost all the varied lengths and shapes of wands now in service at coin-washes.

An important object of the present invention is to provide in a manual car-wash system and device of the type described in any of the preceding three paragraphs, as well as for any conventional home-wash device, novel low-pressure soap-supply means to feed soap to the area of the car-surface being washed, which soap-supply means overcomes all the objections of the present soap-supply systems of manual car-wash devices described above.

Other objects and advantages of the invention will become apparent from the following description, and from the accompanying drawings in which:

FIG. 1 is a partial sectional view of one form of the car-wash device of the present invention, with portions out of scale and out of their normal operating positions to make the concepts easier to understand;

FIG. 2 is an enlarged view of the attachment means of the form of the invention shown in FIG. 1 taken along the line 2—2;

FIGS. 3 and 4 are perspective views of details of the attachment means shown in FIGS. 1 and 2, particularly illustrating angular adjustment means and quick-locking means;

FIGS. 5 and 6 are elevational views of the complete car-wash device somewhat in true scale, particularly illustrating the accommodation of various types of wands at various angles.

FIG. 7 is a view of a single bristle of the preferred form of brushing means;

FIG. 8 is a fragmentary elevational view, partly in section, showing a modified form of soap-supply means;

FIGS. 9, 10 and 11 are fragmentary partial-sectional views of modified forms of the pressure-sensing means associated with the soap-supply means illustrated in FIGS. 1, 5 and 6;

Figure 12:
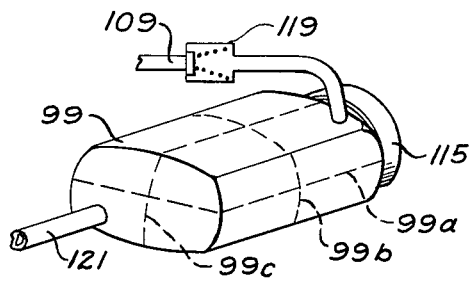
FIG. 12 is a perspective view of a modified soap container.

It is to be understood that the invention is not limited in its application to the details of construction and arrangement of parts illustrated in the accompanying drawings, since the invention is capable of other embodiments and of being practiced or carried out in various ways. Also, it is to be understood that the phraseology or terminology employed herein is for purposes of description and not of limitation.

It is also to be understood that the car-wash invention and any sub-combination thereof disclosed herein may also be used in washing any other object for which the advantages disclosed herein are applicable, such as windows, outdoor tables, floors, airplanes, etc.

In using the device of the present invention in its preferred mode of operation the surface is first cleaned hydraulically, preferably only by water (with soap only for salt or Class V washes), using only the car-wash wand as described above. The present car-wash invention includes an attachable portion or unit assembly having a brush and arranged for use with a jet-wand. At a coin-wash, the attachable portion can be secured to the wand in 10–15 seconds for use as an integral unit during the washing operation for removing the road-film. The attachable portion includes novel means to supply soap automatically during this operation; and in a preferred form this soap-supply is caused by the pressure of the water after emitting from the wand. The attachable portion also includes means to rinse the soap during the washing operation in a manner that the washing and rinsing operations are performed simultaneously for reducing the time of the total wash.

The attachable portion also includes unique means to accommodate all the many different shapes and lengths of wands now used in coin-washes. One part of this accommodating means comprises a simple and novel fast-clamping mechanism to attach to any wand (home or coin-wash) in 10–15 seconds; a second part of this accommodating means, particularly at coin-washes, is the inclusion in the clamping means of a unique angle-adjustment mechanism to enable attachment to varied shapes of wands; a third part of this accommodating means, particularly for coin-washes, is the provision of an open flexible tube to cooperate with the angle-adjustment mechanism for accommodating wide variations of lengths and shapes of wands.

The device of the present invention may also be supplied with its own wand for attachment to garden-hoses to enable the fast and perfect wash at home at no cost in the same manner as for coin-washes, except for Class IV and V dirt formations.

The unique soap-supply systems comprise sub-combination inventions which also are useful in present home-wash devices, although they have particular utility in the main inventive combinations disclosed herein. Similarly, the unique mechanism and means for accommodating all shapes and sizes of wands comprises a sub-combination invention having other car-wash applications although it greatly enhances the main inventive combinations disclosed herein.

In order to provide a practical and quick attachable unit for all wands at present coin-washes, there have been many additional specific and puzzling problems to overcome before achieving the goal of the "ideal" car-wash as previously defined. The attachable unit of my invention includes brushing means which must be extended about 18–24 inches beyond the ends of the wands, because present wands are too short to enable a brush to reach the center of a standard size car if attached at the wand-nozzle without the operator's getting wet.

A particularly puzzling problem in providing an attachable unit is that most coin-wash wands have their tips normally bent at a predetermined angle. An even more serious problem which must be overcome is that the wands frequently are bent further and inconsistently by customers. In addition, the diameters, lengths and original intended angles are different at different coin-washes. Hence, the attachable-portion of the present invention must accommodate not only the many lengths and normal shapes of the wands at coin-washes, but particularly the deliberate and inconsistent bending by customers.

Another difficult and puzzling problem in this type of car-wash device is to provide a construction and arrangement of all components thereof such that the total car-wash time is reduced to about 7–10 minutes, depending on the size of car. This is particularly important since at coin-washes the meter is running during the total car-wash, and the desired cost of car-washes would be 50–95 cents depending on the size of car. Hence, this time has been defined for use hereinafter as "metered time".

In order to help reduce the metered time, an important requirement of this car-wash system is that it must include strong but very light-weight clamping means to secure the attachable portion (with an extended brush) to any one of the varied wands in 15–20 seconds or less, and strong enough to operate as an integral unit. Much worse, with this rapid clamping it is essential that no valves, soap or water lines, etc., must be connected to the wand as a result of the clamping process. Also, by using only the wand during the initial water run-off operation to remove most of the dirt particles, the time of the washing operation is substantially reduced; for the same reason the soap required is also reduced which enables reduction of the rinsing time. Because of this fact, my device is constructed and arranged to provide the rinsing operation simultaneously with the washing operation, thereby saving 2–4 minutes. Also, since all dirt and film are removed, if a dishwasher-type car-soap is used the car will air-dry without spots, thereby saving another 8–15 minutes.

Another important problem in the practical utilization of the present invention is the development of an efficient and simple technique or mode of operation of the device in the car-washing process. All wands at present coin-washes have a single handle designed for one-handed operation. But the most efficient mode of operating the device of the present invention requires two hands for which a second particular type of handle is provided which makes it easier to use, especially for women. The device of the present invention includes many other means to help reduce the metered-time to acceptable limits, to be discussed herein.

My new car-wash device and system enables the same quality wash as a "chauffeur-kept" car, but in a very short time and with very little work (and at low cost). With this device and system, a coin-wash is no longer an "interim" wash, but can provide the best car-wash free of scratching to keep the new-car shine with only regular washing (about 35–45 washes yearly).

The present invention comprises a superb car-wash tool which satisfies all the foregoing requirements and overcomes all the above-described problems inherent in present car-wash systems, as will now be described.

Referring to FIGS. 1–4, the car-wash device includes wand-means 1 comprising a wand 3 having a discharge nozzle or jet 5 at one end thereof and a handle 7 secured at the other end; the wand is connected to a flexible hose 9 supplying water under pressure. In a coin-wash the wand is usually made of steel pipe and is permanently attached to a long flexible hose supplying water at a pressure of about 500–700 psi. For garden hoses the wand includes standard fittings for quick attachment to the hose, and may be supplied as a part of the total device for home washes. The home-wash wand can be made of aluminum tubing for lower weight since the average pressure is often about 35 psi; the wand may also include a conventional on-off valve 11 (usually a ball valve) for purposes to be described. This on-off valve is not presently provided at coin-washes, but would be helpful although not essential. At both the coin-wash and home-wash the wand-means comprises an important part of the total car-wash device of the present invention.

The car-wash device includes an attachable portion or unit assembly 15 having shaft means such as a shaft 17 which carries brushing means 19 suitably secured at one end of the shaft and attachment means 21 mounted substantially at the other end thereof and suitably secured thereto, as by rivets. The shaft may be solid or hollow, but preferably is made of a light material such as aluminum tubing. The shaft is illustrated with a square tubing section and carries a handle 23 having an aperture cooperating with the square tube to enable freely-sliding axial movement on a substantial portion of shaft 17, but to prevent rotary movements of handle 23. The same result may be provided by other means, such as by round tubing having a long slot and a pin carried by handle 23 projecting in the slot.

The brushing means 19 illustrated in FIG. 1 comprises a body 25 having an aperture 27 disposed to receive the end of shaft 17 which is secured to the brushing means, as by a press fit or a rivet. A brush 29 having bristles 29a is attached to body 25, as by screws, to be replaceable when worn. However, the body and brush can be a single unit if desired. As defined, the "brushing means" may comprise a brush, sponge, mop or any other material suitable for washing the car-surface by physical contact, although a particular type of brush is preferred to be discussed.

The body 25 could be made of molded plastic and includes a water discharge-nozzle 33 inclined at an angle in relation to the body. The nozzle 33 can be separate from the body and secured thereto by suitable means, or molded as part of the body. A large flexible tube 37, preferably made of a pliable material such as plastic or rubber, has one end attached to the hose-nipple 35 of nozzle 33 and its other end unsecured for purposes to be described.

The attachable portion 15 includes attachment or fastening means 21, which is provided to quickly clamp and secure the attachable portion or assembly to the wand 3. In FIG. 1, the attachment means 21 comprises a bracket 39 suitably secured to shaft 17, as by rivets, and also includes a lever member 41 hinged to the bracket as shown (or hinged directly to the shaft) by hinge means 43 (FIG. 2) to provide angular movements of the lever member in relation to the bracket (or shaft). The hinge is formed by an extension 41a projecting loosely through a slot in the bracket-extension 39a and retained by a pin or rivet 42.

The attachment means includes means provided to clamp the entire unit to the wand, and further may include means to enable selective adjustment of the angle of the wand in relation to the shaft 17. Referring to FIGS. 1–4, the clamping-means and angle-adjusting means comprise a wide U-shaped adjustable and lockable clamp 45 supported for angular movements about a hinge or pivot pin 47 attached to bracket 39. The adjustable clamp includes a pair of substantially V-shaped clamping surfaces 45a to accommodate various wand diameters. The clamp 45 also includes an arcuate slot 51 coinciding with a similar arcuate slot or merely a hole in the bracket 39 (not shown). A thumb-screw 53 has a threaded portion 53a projecting through bracket 39 and slot 51 of clamp 45 into a square nut 57 which is adjacent a leg of the U-clamp to prevent rotation of the nut. After adjusting the clamp to the desired angle in a manner to be described, the thumb screw is tightened to lock the clamp to bracket 39 in the preselected angle.

The clamping means also includes a shorter U-shaped "floating" or self-aligning clamp 59 loosely attached to the lever member 41 by a hinge or pivot pin 61 to enable the clamp 59 to revolve freely about pin 61. The angular travel of clamp 59 is limited by a post 63 secured to lever 41 and projecting in an arcuate slot 65 of the clamp. The floating clamp also includes a pair of substantially V-shaped clamping surfaces 59a to accommodate various wand diameters.

The clamping-means also includes fastening-means provided to bring the two clamp elements towards each other for producing the desired clamping action. In FIGS. 1–4, the fastening-means comprises a partially threaded rod 67 connected to lever 41 by suitable hinge means to enable angular movements in relation to the lever. As seen best in FIGS. 2 and 4, the hinge means may comprise a pressed pin 69 inserted through ears 71 formed at the end of lever 41. The rod 67 has an end portion hinged on pin 69, and the shaft portion projects through a slot 73 in the lever 41 wherein the slot enables angular movement of rod 67 within predetermined limits.

The fastening-means also includes a U-slot 75 or other aperture means in bracket 39 (FIG. 3) to receive rod 67 in its angular movements. The fastening-means further includes a wing-nut 77 cooperating with the threaded portion of rod 67 to press the clamping surfaces 45a and 59a tightly against the wand to secure the wand for operation as an integral unit with the attachable portion, as shown best in FIGS. 1 and 2.

In the quick-clamping action, the wand is first inserted into the open end of tube 37 which has a bore sufficiently larger than the jet 5 and wand 3 to provide ample clearance therefor. With the rod 67 and its wing-nut 77 swung open, the tubing portion of the wand is pressed against the surfaces 45a of clamp 45; then the rod 67 is moved angularly into slot 75 and the wing-nut 77 is tightened only snugly at first. Because of the "floating" construction and the short length of clamp 59 and the V-shaped clamping surfaces 59a, the clamp 59 automatically "follows" and aligns itself to correspond to any angle preset by the lockable clamp 45. With the wing-nut only snug, the thumb-screw 53 is loosened slightly and the wand is then rocked to any desired angle in relation to shaft 17 for reasons to be described, and then the thumb-screw is tightened. Finally the wing-nut is tightened and the total device can then operate as an integral unit. The construction in which the clamps 45 and 59 are "inside" the bracket 39 and lever 41 enables the wing-nut 77 to supplement the angle-locking action of thumb-screw 53 and nut 57.

Once the angle-adjustment is set for one coin-wash, it is seldom changed as long as the same coin-wash is used. Hence, most of the time only the fastening-means is used to lock the wand in place which can be done in 10–15 seconds or less. The wand can be removed even faster by revolving the wing-nut 77 and quickly moving rod 67 out of slot 75. Thus a single angle-adjusting control member (thumb-screw 53), and a single clamping control member (wing-nut 77) enable the quick and rigid clamping of the attachable unit to wand 3.

The V-shaped surfaces of clamps 45 and 59 permit the clamping of the attachable unit to a wand having any diameter, such as ⅜ to ¾ inch. Teeth-like serrations may be formed on the surfaces 45a and 59a and hardened if desired. The rest of the components of the attachment means are preferably made of a light material, such as aluminum. Instead of serrations, a thin coating of hard synthetic rubber may be bonded to the surfaces of these clamps, if desired.

Various elements of this novel clamping mechanism may be reversed or altered without changing the inventive concepts in any way. For example, the hinge 69, 71, could be carried by bracket 39, and slot 75 would then reside in lever 41. Similarly, the self-aligning clamp 59 could be carried by bracket 39 while the lockable-clamp 45 would then be carried by lever 41. In either of these reversals, or as shown, the rod 67 and wing-nut 77 could be replaced by a long thumb-screw cooperating with a nut hinged to pin 69 without changing the concept in any way. Also the rod 67 and wing-nut might be installed on the lower side of clamps 45 and 59 as viewed in FIG. 2; however the leverage effect and fast action of the form disclosed in FIGS. 1–4 is presently preferred. Knobs could be used for the thumb screw 53 or wing-nut 77 if desired.

When the wand is clamped to the attachable unit as shown in FIG. 1, water is conducted through flexible-tube 37 and out nozzle 33 in front of the brushing-means 19 at reduced velocity so that the rinsing operation can be performed simultaneously with the washing operation. It is important for the fast-clamping action above-described that the nozzle 33 and line-loss in tube 37 restricts the water-velocity only enough to protect the painted surfaces from harm, but not enough to cause water to flow back through the clearance between tube 37 and wand 3 because of "back pressure." For this result, the tube 37 is much larger than the diameter of the wand. In this construction, no clamps or sealing means are required, wherein the wand can be quickly inserted and removed from tube 37 unrestrictedly.

Referring to FIGS. 5 and 6, several types of present wands are illustrated with the attachable unit assembly secured thereto. In FIG. 5, a wand with a straight handle and a bent tip is shown in the position presently preferred. The flexible tube 37 conforms to the angle of the tip of wand 3, and the wand-angle is selected by thumb-screw 53 so that the overall bend of wand 3 and tube 37 gives the best results for any length and shape of the wand.

In FIG. 6, a wand having a pistol-grip handle 7a is shown in the position presently preferred for this type of wand and functions satisfactorily. The angle of the wand in FIG. 6 is reversed from the wand-angle shown in FIG. 5 because the pistol-grip handle projects upwardly in FIG. 6. Again, the flexibility of tube 37 cooperates with the angle-adjustment to accommodate any length and shape of pistol-grip wands. Some of the wands of both types have straight tube-portions without a bent tip (FIG. 1). The angle of these straight wands is adjusted as shown in FIG. 1 between the positions illustrated in FIGS. 5 and 6.

In all angular positions of the wands, as illustrated in FIGS. 1, 5 and 6, the wand lies substantially in the same plane as shaft 17 and is generally parallel thereto. The term "wand" as previously defined herein, is further intended to cover any type of wand (or other means for hand-spraying water on a car surface) regardless of the type of handle or its length or whether the tip is bent or straight.

The wand for garden-hoses can be made of any desired shape. While it can be made straight as now provided in some present coin-wash wands, a slight bend at the tip of about 12–15° appears desirable. The wand for garden-hoses weighs about 5–6 oz., whereas the coin-wash wand weighs about 2 pounds.

For wands having a straight or very slightly bent tip, it might not be necessary to provide both the angle-adjusting means and the flexibility of tube 37 since either one of these two components might suffice. However, for wands with larger tip-angles which are frequently made worse by deliberate customer bending, both the angle-adjustment means and the flexibility of tube 37 are necessary. Even if it were possible to standardize the shape of the wands at all coin-washes, the full range of adjustment provided by the angle-adjusting means and flexibility of tube 37 probably will always be required unless the large amount of wand-bending by customers can be prevented.

The attachment means 21 is preferably mounted as close as possible to the handle 7 and at the end of shaft 17 for several reasons. First, regardless of intentional and customer bending of coin-wash wands the section near the handle is substantially straight. This fact enables positioning the brushing means 19 sufficiently beyond the end of the jet 5 to enable washing all car surfaces without the operator's getting wet. Also, with the attachment means 21 secured near the handle 7 the leverage and inertia forces due to the weight of the attachment means are minimized. More important, the unique construction enables the shaft to be spaced and generally parallel to the wand to provide rotary rigidity to be discussed; also the brushing means can be relatively fixed in a predetermined relationship with respect to the position of the handle in all wands. However, the jet-end of the wand may be of varied shapes and is accommodated by the angle-adjusting means 21 in cooperation with with the flexibility of tube 37 irrespective of the position of the brush in the space directly above the shaft 17 as viewed in FIG. 1. In this novel combination of elements, the jet 5 discharges water to the car-surface in a substantially predetermined and consistent manner in relation to the brushing means 19 and handle 7, regardless of the irregular paths of the water from the wand as shown by the variations in FIGS. 5 and 6.

Still another reason for mounting the attachment means at or near the end of shaft 17 is to provide ample length for axial movements of handle 23 wherein two hands may be used to operate the car-wash device in a manner to be described.

Restraining means are provided to prevent or restrain the flexible-tube from blowing off the wand during the washing operation, particularly if the wand-angle is large at coin-washes where the velocity of the water emitting from the jet 5 is very large. Also, the restraining means permits the wand 3 to be readily inserted in hose 37.

In FIG. 1, the restraining means comprises a lost-motion mechanism such as a ball chain 81 and/or a spring 85 connected at one end to the flexible tube 37 and at its other end to a fixed portion of the attachable unit, such as to bracket 39. A snap-piece 83 is suitably secured to bracket 39 and includes a snap slot portion for enabling any ball of the chain to snap into place similar to a key chain. In this manner any desired amount of "lost motion" may be selected. The lost-motion or "play" enables the tube 37 to move out sufficiently and flex a predetermined amount to accommodate any shape and bend in the wand. Without the chain and/or spring 85 and with sufficient bend in the wand, the water impact from nozzle 5 can blast the tube off the end of the wand; this is prevented by spring tube 85, or by chain 81 when it reaches its full length. The chain needs only occasional adjustment for extreme wand bends, or it can be permanent. The restraining means also permits a shorter and thinner wall thickness of tube 37, thereby reducing weight and cost.

One form of restraining means may comprise only the extension spring 85 connected at one end to flexible tube 37 and at its other end to bracket 39, for example. In addition to providing a lost-motion action, the spring 85 tends to align the end of tube 37 for enabling easy insertion therein of wand 3. The spring or chain may be provided alone without the other, or they may be provided together as shown.

In FIG. 5 the chain is replaced by a rod 87 connected to tube 37 and slidable through a hole in an angle-piece 89 with an adjustable lock-piece 91 to provide the lost-motion action. In FIG. 6, the restraining means merely comprises a chord 93, such as nylon, permanently connected at one end to the tube and at its other end to bracket 39.

In the car-wash device of the present invention, all parts are made as light as possible, preferably of plastic or aluminum unless special strength is required, as for the clamps 45 and 59.

Means are provided with the attachable unit 15 to supply pressurized soap automatically to the area of the brushing-means during the washing operation. In FIG. 1, the soap-supply or feed means includes pressure-sensing means 95 and soap-container means 97 which includes novel means to pressurize the soap by transmitting the pressure from the pressure-sensing means to the soap in the container means for causing soap to flow automatically to the brushing area. The pressure-sensing means also is used to cause the flow of a small amount of water from tube 37 to the brushing area for mixing with the soap during the washing operation.

In FIG. 1, the soap-supply means includes a soap-container or bottle 99 which is carried by shaft 17 and held by suitable means, as by a screw, to enable replacement of the bottle. A flexible member responsive or sensitive to slight changes in a sensing pressure (to be discussed) is shown in FIG. 1 as a bladder or balloon 101 inserted inside bottle 99. The bladder is formed similar to a toy balloon and has the same resiliency and thickness, except it must be made of material such as neoprene to be unaffected by chemicals in the soap. The bladder 101 includes a small neck portion, as in a toy balloon, that slips over a rigid tube 103 which extends inside the bladder and also projects out through the left end of the bottle and is sealed thereto to be airtight. The neck of the bladder is sealed tightly to the tube 103 by a sealant and/or by suitable clamping means. The tube 103 has one or more openings or ports so that the sealed interior of the bladder and tube in effect comprises fluidically a single chamber 105, and hence is always subjected to the same pressure throughout regardless of its magnitude. The tube 103 extends inside bladder 101 to maintain the shape thereof. The other end of tube 103 forms a hose nipple portion 103a. A flexible tube 109, which may comprise rubber or plastic, slips over the nipple 103a at one end and at its other end slips over a similar nipple at the pressure-sensing means.

The pressure-sensing means 95 shown in FIG. 1 comprises a rigid tube 111 made of plastic or metal and includes an aperture or orifice 113 subjected to the water mass and velocity (and possibly some static pressure) in tube 37 after the water is emitted from the jet 5. The water mass and velocity striking the aperture 113 produce at least a velocity or impact pressure inside tube 111 which is very low in relation to the water-pressure in wand 3, to provide great utility in a manner to be discussed. This water-pressure is transmitted through flexible tube 109 to chamber 105 which tends to expand bladder 101.

A second chamber 107 is formed between the inside of the bottle and the outside of the bladder. This chamber is filled with liquid soap by holding the attachable unit vertically while resting on nozzle 33 and removing the threaded bottle cap 115. The head of soap helps to collapse the bladder since a subatmospheric pressure then exists in chamber 105. This subatmospheric pressure is the result of water-seepage through orifice 113 into chamber 105 during operation of the device. When the device is held vertically for filling, this water desirably produces a vacuum in chamber 105 as it runs out through tube 109 which automatically tends to collapes the bladder 101 to enable maximum soap volume in bottle 99. After filling the bottle with soap, the cap is secured tightly.

When water flows through tube 37 it strikes orifice 113 to produce pressure in chamber 105, so that bladder 101 pressurizes the soap in chamber 107 as long as water flows in tube 37. This pressure causes soap to flow through a by-pass passage 117 which communicates with both ends of the bottle, then through a check-valve 119, through a flexible tube 121, past a manually adjustable metering valve 123, to discharge at the brush area through a tube 125. Check valve 119 prevents reverse soap-flow when no water is flowing through tube 37 and valve 123 remains open.

The by-pass passage 117 enables at least 95% of the soap to flow out freely from both ends of the bottle when the bladder seals the center portion of the bottle; the passage 117 permits soap from the end of the bottle to by-pass the center portion of the bladder when it seals the interior surface of the bottle. The pressure in tube 37 also causes a small amount of water to flow through a tube or passage 127 to discharge at the brushing area for mixing with the soap discharged from tube 125 during the washing operation. The tube 127 acts as a restriction or jet to contain the pressure from tube 111 to act on the bladder. This small water and soap flow provides the same mixture-ratio of soap and water as in a bucket thereof when used in a hand-wash.

Hence, in the manner described, the bladder acts to transmit the pressure of the water velocity, after emitting from jet 5, to equivalent soap-pressure for causing soap to discharge slowly but automatically from tube 125. The valve 123 is adjusted by the operator to give the desired soap-flow-rate, usually less than one drop per second, which provides just enough suds to be visible. Only a small amount of soap is necessary since most of the large dirt particles are first removed hydraulically by the wand alone in the water run-off operation, and only the remaining dirt-film must be removed.

In order to help understand the inventive concepts, disclosed herein, the metering valve 123 is illustrated in FIG. 1 in a position revolved 90° from actual use, as properly shown in FIGS. 5 and 6. Similarly, the passage 117 and check-valve 119 might be in the portion of the bottle at the lower rear, as viewed in FIG. 1 and as seen in FIGS. 5 and 6. Since the soap only flows when water passes through tube 37, the only reason for closing valve 123 is to prevent soap from dribbling out of tube 125 when the device is carried with the brush down. If the device is carried with the brush high or level, no soap will flow even if the valve 123 remains open without water-flow in tube 37.

For the brushing means 19, a good brush is presently preferred over a sponge because a sponge traps dirt which scratches paint. But if ordinary bristles are soft enough to prevent scratching, the brush will not remove the road film; and if the bristles are stiff enough to remove the road-film they scratch the paint. FIG. 7 shows a bristle 29a which has been used for paint brushes and other applications, but has particular utility in the inventive combinations disclosed herein. The bristle shown in FIG. 7 is fairly stiff but the ends 29c are frayed or split into a plurality of very small and softer bristles for a short length of the bristle. In this type of brush the bristles sometimes are referred to as having "exploded tips" caused by "flagging". When the entire brush is made with these frayed bristles, the brush has a matted feel similar to soft cloth; but actually the brush comprises thousands of small bristles which cause no scratching if used as permitted by the car-wash device of the present invention.

Although other brushing-means may be used, the inventive combinations disclosed herein are particularly enhanced by a brush 29 having frayed ends 29c because the soap is discharged through tube 125 separately from the water discharged through tube 127. The frayed ends of the bristles tend to hold the soap long enough to provide proper mixing with the water, thereby enabling the car-wash device of the present invention to provide the fast and excellent car-wash in the manner described herein.

However, the frayed ends might cause dirt to scratch the car-paint if the brush is applied directly to a dirty car-surface as a first step even if accompanied with soap and water. The surface-tension of the soap and water cooperate with the frayed ends to hold all the larger dirt-particles, which then scratch the paint as the brush is applied to all surfaces of the car. If this is done the brush appears very dirty. When using the device of the present invention, the wand 3 is preferably first used by itself in the run-off operation to remove hydraulically all the larger dirt-particles. Then when the frayed brush is used in the washing operation in the next step, the brush is maintained free of dirt because the frayed ends do not hold the very small remaining dirt-particles if any. Tests have shown that the present car-wash device having frayed bristles and used in this manner produces less paint-scratching than any other kind of car-wash.

OPERATION

Now the entire operation of the complete car-wash device will be explained, using the technique or mode of operation presently preferred at a coin-wash as an example.

There are several types of coin-boxes used at coin-washes. In a preferred type, start and stop buttons are provided to turn the water-flow on or off as desired within the metered time-period; in a second type of coin-box, no means are provided to stop the water until it stops automatically at the end of the metered time period.

Before starting the first wash, the wand is temporarily inserted in tube 37 and secured to the attachable unit to set the desired angle with thumb-screw 53 as shown in FIGS. 5 and 6. This initial angle-adjustment is only done at the first car-wash if the same coin-wash is used repeatedly, and usually does not have to be done again.

The wand is then removed, and the attachable unit is laid on the deck of the coin-wash near the coin-box ready for use before starting. For the water run-off operation, the operator first uses the wand entirely by itself, preferably using only water unless the car-surface has salt thereon. The water-spray is directed by the operator to the car-surfaces while he gradually circles the entire car to direct the water blast from the top to the bottom surfaces to run off all the large particles of dirt, dust, sand, etc., leaving only the road-film if present. On a large Mercury, this operation usually requires about 3 minutes if the car is dirty.

If the coin-box has the usual stop button, it is pressed to stop the water-flow. For the washing operation, the attachable unit is picked up and the metering-valve 123 is opened as required; then the attachable unit is secured to the wand by using the attachment means 21 and inserting the wand in tube 37 such that the handle 7 is about 2–4 inches from the attachment means.

The start button is again pressed or another coin is inserted. The complete assembled car-wash device is then used to wash the car. The operator first washes the entire top surfaces by starting on the roof. A right-handed operator holds the handle 23 (in a desired axial position) with the left hand and handle 7 with the right hand. The operator first cleans half of the roof by moving the brush sideways alternately in a reciprocating motion, whereby the continuously flowing soap from tube 125 mixes with the water from tube 127 in the correct ratios to clean the surface swept by the side motions of brush 29. At the same time, the rinse-water is discharging to the car surface from nozzle 33. Hence, the operator starts at the center of the roof and as he moves the brush back and forth sideways, he gradually pulls the brush towards himself (toward the outer roof edge) about one brush-length per stroke so that a new area is gradually washed while the previously-washed areas are rinsed by water from nozzle 33, and all at the same time. The nozzle 33 and the line-loss in the tube 37 restrict the flow of rinse-water to the same or less velocity as normally provided at the car-surface with a wand by itself when rinsing off soap; this lower velocity from nozzle 33 is necessary to avoid paint damage. The rinse-water carries away all the soapy water and the loosened remaining dirt from the car-surface. On the side surfaces, the rinse water runs off the dirt and soap by gravity. Because the wand by itself removes a large portion of the dirt initially in the run-off operation, only a small amount of soap is required (just enough to see suds) to remove the remaining dirt-film. This fact enables the rinse-water from nozzle 33 to remove the soap simultaneously with the washing operation without soap-residue. But if a large quantity of soap had to be rinsed, it would not be completely removed in the desirably short time of the washing operation.

The operator then cleans the windshield in the same manner as for the top, starting at the center and moving the brush sideways (up and down) while pulling it towards himself. Next, the operator cleans half of the hood in the same manner, and then the operator moves to the other side of the hood and cleans the remaining half. Next, the other half of the windshield is cleaned and then the other half of the top is washed in the same manner; the operator moves around the car without backtracking to clean the remaining top surfaces until the entire top is cleaned.

The sides are cleaned in a similar manner except that the car-wash device is held differently. The sides are cleaned by the operator's moving sequentially to definite positions in one direction and cleaning the total reachable side area at each position. A first position after finishing the top surfaces might be at the center of the left side of the car; the next position might be at the left front wheel; then the front grill area is the next position; the remaining positions in sequence might be at the right front wheel, the right center, the right rear wheel, the rear bumper area, and finally at the left rear wheel.

At each of these side positions the operator first cleans the lower half of the car by using a pendulum-action with the left hand on handle 7 and the right hand on handle 23 to hold the car-wash device substantially vertically in suspension in a manner similar to holding a broom. The operator cleans the lowest portion first by moving the brush back and forth sideways in a pendulum motion somewhat like a combination of a broom and canoe-paddle action to sweep the surface. The brush is gradually raised on the surface one brush-length per stroke until the lower half is cleaned. In this action, the rinse-water from nozzle 33 simultaneously cleans off the soap by gravity. The remaining upper portion of the side surface (still at this first position) is cleaned by supporting the device substantially horizontally with both hands dividing the weight, and holding the same handles as for the prior pendulum-action. The brush is positioned to the right of the operator (reverse if left handed) and the remaining upper portion of this same side-surface is cleaned by moving the brush up and down by means of a rocking action, while gradually moving the brush to the left away from the water-discharge by advancing one brush-length per stroke. In this procedure, the remaining upper surface is washed, while the water from nozzle 33 simultaneously rinses the soap from the upper portion and also rinses any remaining soap on the lower portion as the rinse water runs down by gravity. The side windows are washed in the same manner. In this procedure, the handle 23 is positioned axially as desired by each operator to best accommodate his height and strength.

The foregoing procedure is used sequentially at all side positions as the operator moves around the car to wash all the side and end surfaces until the car-wash is completed. The procedure is much simpler than would appear from this necessarily long discussion, and is surprisingly easy to learn. A large Ford has been consistently washed in about 9 minutes. This fast time is very important at coin-washes because the meter is running. The same procedure is used for garden-hoses to reduce the time compared to using other car-wash devices.

Other techniques and procedurs have been tested with my car-wash tool, but so far the foregoing procedure appears to give the best and shortest wash and is easiest to use; and the operator does not get wet because he stands "outside" the device.

After completing the car-wash, the owner can merely turn on his windshield wipers and drive away, and the car-surfaces will air-dry. If the owner has another minute, it helps to use a squeegee to dry the windows.

When the car-wash device is being used at a coin-wash, there is no reaction from the high-pressure water since the forces are cancelled. In fact, when the time-meter turns off the water and another coin is required, the assembled device can be laid on the deck while the operator walks over to the coin-box. When the water starts again, the device is inert and can be picked up by the operator to finish the wash. A wand by itself at a coin-wash reacts like a jet plane if it is loose.

As previously stated, an important purpose of this car-wash invention is to provide an excellent car-wash in a short time at low-cost without scratching. For the foregoing procedure, my car-wash device provides a continuous and metered liquid soap-flow mixed with a small water-flow at the brush for cleaning progressively a small car area, while at the same time the previously-cleaned small area is being rinsed by directing the large flow of rinse-water from nozzle 33 away from the soaping area, thereby reducing the car-wash time by several minutes. The separate rinse is eliminated since soaping and rinsing occur simultaneously. The soap is caused to flow separately from the flow of water in tube 37 to permit this water-flow to be clear and give the simultaneous rinse.

The brush may be oval shaped, or rectangular for example about 3½ inches wide and 10–12 inches long. With this length, only one sweep for each brushed portion of the car-surface is necessary since only the dirt-film remains after the water run-off operation. In the washing operation the brush is moved almost one brush-length to clean the next adjacent portion. In addition to this time-saving factor, this procedure provides additional utility because the soap cannot dry out before the rinse, which often occurs in present do-it-yourself car-wash methods.

As explained, the initial run-off is important in obtaining a scratch-free wash. The best possible run-off is obtained at a coin-wash because of the high pressure, and also because the car-owner himself cleans his own car and takes the time to perform this important operation properly. In a drive-through wash, the water is merely sprayed initially, or an operator uses a wand for only a few seconds which is insufficient time for a Class III, IV or V wash, wherein the large dirt particles then scratch the car as they are removed by the whirling brushes. It appears that the scratching in drive-through washes is caused as much by the large dirt particles (which were not originally run-off) as by the whirling brushes. Hence, the advantage of my device at coin-washes is the operator's personally selecting and directing the high-pressure stream to every part of the car-surface in the optimum manner to initially run-off the heavy dirt-particles.

After discussing the operating technique of the car-wash device, the utility of its construction as shown in FIG. 1 can be appreciated. By securing the wand at a spaced distance from shaft 17 and generally parallel thereto, it is much easier to maintain the brush perpendicular to the surface being cleaned, especially for women. Since handle 23 is movable only axially and is spaced from handle 7 in the same plane, excellent rotary leverage is provided for people who do not have great strength.

Also, the difficulty of the clamping problem can now be appreciated. The clamping mechanism must be as light as possible and must quickly install or remove the attachable portion to the wand; but it must be strong enough when clamped near the handle to operate with the wand as an integral unit for enabling the operator to apply the necessary force on the brush without bending or coming loose. The novel clamping-mechanism disclosed herein has solved this puzzling problem.

If not enough soap is used in the foregoing procedure, the operator tends to repeat each stroke-area or to produce excessive overlap, which increases the total car-wash time excessively. If too much soap is used, then the rinse-water does not run off all the soap since the car-wash is so fast. When the correct amount of soap is used the suds are just visible; then the small amount of dirt remaining after the run-off operation is removed in each sweep or stroke so the brush can be advanced almost one brush-length for the next stroke with minimum overlap. The selection of the correct amount of soap by observing the suds is not critical, but the operator must avoid extremes. The soap-flow changes slowly when valve 123 is adjusted because the frayed brush holds the soap; hence, adjustments are made in small increments to make the suds just visible.

The soap-container 99 preferably is made of transparent plastic so the bladder can be seen; when the bladder is flush against all surfaces of the bottle it is empty. One filling of the bottle provides enough soap for about 5–8 car-washes on a large Ford; this large number of washes per bottle reduces the time chargeable to each car-wash. The soap-container could optionally be made as part of the body 25 if desired, but the form shown in FIG. 1 gives better visibility of the bladder to show when soap is needed. Also, the bottle 99 can be replaced if worn or broken; for this purpose, valve 123 could be made as part of the bottle 99. As an alternative, valve 123 could be combined with check-valve 119 and made replaceable for service.

The bottle 99 may be mounted about 6 inches from the brush in which the extra head and centrifugal force cause slightly more soap-flow when brushing the lower portion of the car with the device vertical. In addition the inertia and leverage effects due to container-weight is reduced. Also as an alternative, instead of the sensing-means 95 measuring positive pressure, a sensing-means may be used to produce vacuum; any usable pressure-differential which measures or senses the pressure or flow of water in tube 37 after emitting from the jet 5 may be used to cause the soap-flow. However, the sensing means disclosed in FIG. 1 has particular utility.

If desired, the sensing-pressure can be directed through the tube 109 to chamber 107, and the soap then must be inserted in chamber 105 inside the bladder 101 which would be connected to passage 121 to direct soap to the brush area. However, the preferred form shown in FIG. 1 is much easier to make and use.

The rigid tube 103 in the form shown is helpful in maintaining the bladder in the best position within bottle 99. All the components exposed to the flow of soap preferably should be of non-corrosive material such as plastic. Also as shown in FIG. 1, the check-valve 119 is very useful because it prevents soap and air from returning to chamber 107 when water is not flowing in tube 37 and valve 123 remains open. Then when the device is used again the soap starts to flow immediately whereas there would be a time-delay if the check-valve were omitted.

The soap-supply means disclosed herein actually functions as a "soap-injection" carburetor, which automatically starts and stops and "meters" the flow of soap and water to the brushing area when the water in passage 37 is turned on and off. And this soap-control system is provided without any fluid connections to the wand such as tubes or seals, thereby permitting the wand to be inserted and removed in seconds and helping to provide the desired fast car-wash. For the soap "metering," a dial having arbitrary numbers with a pointer on the knob of valve 123 would enable predetermined soap settings. Also, the restraining means, and particularly the spring 85, tends to hold the tube 37 in a more consistent position in relation to the wand which therefore maintains more consistent pressure in tube 109 in all positions of the car-wash device by preventing tube 37 from flexing excessively at different positions.

The soap-supply means which includes the pressure-sensing means 95, the soap-container means 97 and the valves 119, 123 and tubes 121 and 125, has great utility for both coin-wash and home-wash devices. As previously explained, the pressure in garden-hoses is 35–100 psi which is about 1000–3000 inches of water. As explained before, this relatively high pressure has forced the use of tiny soap-feed orifices in prior home-wash systems. These small soap-orifices often become plugged by small dirt-particles to cause malfunction. This puzzling problem has been "solved" in prior devices by using larger orifices which cause an excessive and wasteful soap-flow requiring more time to rinse.

For a coin-wash, the wand-pressure by itself could never be used to cause a soap-flow separate from the clear water passing through tube 37 for simultaneous rinsing. This is true because the pressure of the water at coin-washes is about 14,000 inches of water (at 500 psi). If this enormous total pressure were used by itself to cause soap-flow, the orifices would be microscopic and completely impractical. But the pressure-sensing means 95 of the present invention reduces these large pressures to only 10–25 inches of water from 22,000 inches of water (at 800 psi) when a coin-wash wand is used.

Extensive tests of the soap-supply system disclosed herein have proven that relatively large passages and valves can be used to give excellent soap-control with good reliability in all circumstances at all usable coin-washes, and also for garden-hoses. This startling and useful result is made possible by sensing the pressure of the water after it discharges from the jet 5, and because of the clearance between the wand and tube 37.

Another useful result of the low soap-pressure is that tubes 109 and 121 can be made of rubber or plastic and connected merely by forcing their ends over hose-nipples without clamps. In this manner the soap-container means 97 and metering-valve 123 can be made easily replaceable and cleanable. And the metering-valve is not critical because its valve seat can be large, such as 5/64 inch dia. This novel soap-supply system has particular utility in the form of the invention shown in FIG. 1 as part of an attachable unit usable for both a coin-wash and a garden-hose. In this form of the invention, in order to enable clear water to flow through tube 37 for simultaneous rinsing, the soap-supply means must be physically self-contained in relation to the tube 37 and carried by the attachable unit. Also, in order to enable the wand to be inserted quickly in tube 37 without requiring hose-connections to the wand, the soap-supply means must be physically separate and independent of the wand. However, the soap-supply means is not operationally independent of the wand because the pressure in bladder 101 is produced in cooperation with the water after discharging from the jet 5.

This soap-supply means, per se, has additional utility for use with present home-wash devices even when made a permanent part of the system, not just for an attachable unit.

The soap-supply system of the present invention in acting as a "soap carburetor" is the equivalent of (and replaces) a four-gallon bucket of water with a teaspoon of soap mixed therein for one home-wash as usually directed or for use at a coin-wash in cooperation with a hand-cleaning procedure. The washing operation for large Ford is about 6 – 7 minutes. A teaspoon of soap if used in seven minutes is equal to a continuous flow-rate of about one drop per second or less. Also, 4 gallons of water if used in about 7 minutes is equal to a continuous flow rate of about 3/5 gallon per minute or about 1/100 gallon per second, which is only a trickle. The soap-carburetor action is produced by the soap-supply means disclosed herein to provide these desired flow-rates (equivalent to the "bucket" mixture) in a continuous discharge from the water tube 127 and the soap tube 125 as manually permitted by valve 123. Hence, the bucket of soap and water is replaced by soap-container 97 and tube 127 in cooperation with the novel pressure-sensing means 95, except that one filling of the bottle 99 equals about 5–8 buckets of soapy water.

In all coin-washes, as for all "jet-washers," a very strong soap is used which contains chemicals intended to remove road-film without physical contact on the surface, as by brush or sponge. All these soaps actually fail to remove road-film because if the soap is too strong the paint will be attacked. Tests indicate that soaps which are strong enough to remove dirt-film also tend to attack the paint. If the soap is not strong enough to harm the paint, it will not remove all the road-film unless some kind of brushing means is used. All jet washers, as at coin-washes, provide from 100 to 400 times the necessary amount of soap in attempting to remove road-film without brushing the surface. Not only does this increase the required rinsing time, but it may eventually lead to pollution problems. The soap-supply system of FIG. 1 as disclosed herein provides only the small amount of soap required to loosen the remaining road-film after the hydraulic run-off operation using only water. This small amount of soap permits the simultaneous washing and rinsing-action described above, and in future years may help prevent pollution. Legislation has been passed by Congress to apply severe restrictions on waste-discharges, and to require water and waste reclamation for all car-washing facilities.

Also, one of the main factors in the utility of the present invention is to clean the car-surfaces good enough to air-dry, as done for dish-washing. For this purpose, the quality and characteristic of the soap used is very important. Soaps intended for use with jet-washers have inherent problems as discussed above. A second class of soaps is more mild than jet-washer soaps and is intended for use with a sponge or brush for home car-washing; these mild soaps have certain advantages over jet-washer soaps. The mild soaps appear to rinse easier and more completely with better sparkle and with less soap-spots after air-drying than with jet-washer soaps. Tests have shown that one or two commercially available soaps in this class are superb for producing a sparkling car-wash after air-drying with negligible soap-spots. These superb soaps also produce minimum removal of a good car-wax, which is entirely removed by all jet-washer soaps, especially with hot water. Since the form of the invention shown in FIG. 1 includes its own self-contained soap-supply means, car-owners can select one of these excellent car-wash soaps for use at a coin-wash to provide sparkling air-dried surfaces with minimum removal of wax if present.

If the bottle 99 becomes empty or if the device is left in a car-trunk and the soap freezes in cold weather below 30° F, the heated soap and water which is supplied at a coin-wash may be used; however in this method the wash requires more time at higher costs, and a car-wax will disappear. With this method the wand is first used by itself to discharge only water in the run-off operation. Then the attachable unit is secured to the wand using soapy water through tube 37 discharging on the surface from nozzle 33, and the complete device is used in the washing operation as described above, except the rinse is not simultaneous. Finally, a separate rinse operation must be performed by removing the wand from the attachable unit and changing the selective control to provide clear water; thus with this method the car-wash time and cost are increased. However, the present device is versatile to provide a car-wash even in these extreme circumstances, thereby increasing its overall utility.

Also, for additional versatility if grease, oil or excessive salt-coating adheres to the car-surface, the strong coin-wash soap may be used during the run-off operation (instead of water alone) to help dissolve these impurities. Then the washing-operation includes the soap from bottle 99 as before, but a separate rinsing operation is usually required to remove the excess soap. Hence, the operator has a ready choice of a strong or mild soap as required. Since car-surfaces are usually free of oil or grease, the mild soap in bottle 99 is used most often with the advantages discussed above. Of course as an alternative to help remove oil a salt-coating or grease, the bottle may be filled with a jet-washer soap with its inherent disadvantages; but then this strong soap must be used for each car-wash.

The time of the car-wash can be reduced further if the coin-box is made cumulative and selective by providing a 25 cent slot and a 10 cent slot; then the total time can be selected beforehand in any total of money combinations. The car-owner would purchase the total time needed to was his car depending on the size and amount of dirt thereon. For a Pinto the owner might need a total of 50 cents worth of time; a Maverick might need 75 cents worth, a large Ford 90 cents, and a Lincoln 95 cents, as examples. Then the operator is not required to stop once or twice during the wash in order to walk over to the coin-box to insert another coin, and then return to continue the wash. If the operator's original time estimate is short, an additional coin might be inserted to finish the wash.

Also with a cumulative coin-box, a Class I or II car-wash may be purchased for 40 cents, for example, whereas it would still cost $2.00 or more for the same wash at a large production facility.

Hence, another great utility of the present invention is to permit a lower cost for smaller cars and/or with less dirt, in which the car-wash price varies with the size of car and the class of car-wash; to some extent this is possible even with the coin-boxes presently provided at coin-washes.

For the foregoing technique, a valve 11 would be slightly preferred over a stop-button in the coin-box because it is faster; this on-off valve is similar to the rotary valve in a shower head. Another preferred alternative would be to provide the cumulative coin-box as discussed above. With this coin-box the desired amount of time for the water run-off would be purchased, such as 25 cents worth, and the water-flow then would stop automatically when done; next the attachable unit would be secured to the wand and the correct metered-time for the washing operation would be purchased; then the car-wash would be completed as described above.

In a broad sense, the car-wash device of the present invention can perform simultaneously any two of the three car-wash operations, with one of the two being the washing operation. If desired, the soap supplied at a coin-wash may be used during the washing operation to discharge from nozzle 37. If the brush is moved toward the liquid (soap and water in this case) discharging from nozzle 33, the run-off operation presumably could be accomplished along with the washing operation in which the liquid from nozzle 33 would tend to produce the run-off just before the brush cleans the surface. When this operation is finished, the control is changed to provide pure water, and the wand is removed from the attachable portion (which can be done while the water is running); the wand is then used alone for the rinsing operation. While this mode might be done especially for Class I–III washes, because of the required low-velocity of liquid from nozzle 33 the initial run-off is not adquate in relation to the reverse mode described above. Tests have shown that when the car is very dirty and this alternate mode is used, excessive dirt collects in the frayed bristles which tends to scratch the car. Also, the detrimental factors in using a strong jet-washer soap has been discussed. The form shown in FIG. 1 with its own soap-supply system is most useful for reasons discussed above.

The unique clamping and/or angle-adjustment means, per se, has utility even to clamp a brush or sponge by itself to a jet-washer-wand in any manner, such as for directing the wand-water to the brush (as through tube 37) instead of to an area away from the brush, as in FIG. 1. However, with this construction the water-velocity should be reduced to avoid paint damage. This might be used with separate soap-supply means as disclosed herein; or it could be used without the separate soap-supply means if the coin-wash soap is used, but then a separate and additional rinse would be required. Hence, for greatest utility of the overall concepts disclosed herein which enables an efficient operating technique, the means to direct rinse-water away from the brush is extremely useful because it provides simultaneously the washing and rinsing operations. Also, to avoid paint-scratching, the large dirt particles should be run-off first hydraulically before applying a brush, particularly with frayed bristles.

In view of all the foregoing, it is clear that my car-wash invention has great utility by providing a better car-wash in an extremely short time at a very low cost with minimum scratching, with even less time and cost for small cars.

This very fast car-wash reduces metered time at coin-washes and this time reduction is made possible by any of a large number of factors and components of the inventive combination, such as: (1) the quick-clamp action of the attachment means; (2) the adjustable threaded rod (or other quick-fastening means) 67 which helps to provide the quick insertion and removal of the wand; (3) the angularly-adjustable clamping means including the self-aligning clamp 59 which requires only a single angle-adjustment; (4) the flexibility of tube 37 which permits quick insertion of most existing coin-wash wands and accommodates all shapes thereof; (5) the restraining means 81, 85, to enable quick insertion of the wand in tube 37; (6) the enlarged open end of flexible tube 37 combined with the proper restriction of nozzle 33 which permits quick insertion and removal of the wand; (7) the tube 37, in the preferred mode, which discharges only water during the washing operation to provide simultaneous washing and rinsing operations; (8) the extension of brush 29 beyond the end of wand 3 in a predetermined relationship with the handle regardless of the bends in the wand, which enables a fast sweeping of the car surface in a very efficient technique without the operator's getting wet; (9) two handles, one fixed and one movable only axially while restricted from rotation, which help to provide the efficient technique; (10) the novel soap-supply system which is physically independent of the wand with no connections thereto to permit quick insertion and removal thereof in the tube 37 and in the clamping means and which enables low-pressure operation with large orifices; (11) the continuous soap-feed which starts and stops automatically when the wand is inserted or removed from tube 37 or when water is turned on or off, thereby reducing metered time; (12) the soap-pressurizer which enables a continuous supply of soap and makes the filling time easier and shorter; (13) the very low required rate of soap-flow so the bottle 99 is filled only once very quickly each 5–8 car-washes to reduce total car-wash time; (14) a very small amount of water which discharges automatically to the soap area independent of the wand to help quick insertion thereof in tube 37; (15) the brush with frayed bristles which facilitates separate soap-discharge by holding the soap, which in turn enables the quick insertion of the wand in the open tube 37 (since this soap-supply system is independent of the wand); (16) the total inventive combination which cleans the car thoroughly to permit air-drying, thereby saving much time.

The spectacular result of all of these time-saving factors is that my car-wash device can clean a large Ford perfectly with minimum paint-scratching in about 9 minutes.

The car-wash device of the present invention, particularly when used at coin-washes, is actually part of a "system" in which the operating technique is a second part and the coin-wash is the third part of the system. Numerous modifications can be made in the coin-wash portion of the system to improve the total operation, for example by modifying the coin-box as discussed previously.

With the car-wash device of the present invention, in view of economic inflation and the resultant trend toward do-it-yourself in many areas of our society, car-owners can obtain a quick and easy car-wash at low cost either at home at all times in warm weather, and in summer in northern cities; or they can wash their cars at coin-washes in 5–10 minutes for 50–90 cents, at least in winter and/or when traveling. The increase in leisure activities causes more people to travel; if the car-wash device is used mostly with garden-hoses by some people, when they travel the device can then be used at coin-washes which are now available in most small towns and are usable at most hours. The quality of the car-wash with my device is as good or better than the best wash by any means using buckets of soapy water and sponges requiring 25–45 minutes on a do-it-yourself basis; and this car-wash produces minimum scratching to maintaining the "new-car" shine for many years. In addition, my device enables great diversity in a selection for optimum handling of all classes of car-washes to suit many varied conditions as defined previously. This very useful result has not been possible prior to my invention, and is now possible and feasible only because of the novel inventive concepts disclosed and claimed herein.

MODIFICATIONS OF FIGS. 8–17

FIG. 8 shows another means to supply pressurized soap automatically to the area of the brushing means. While the bladder 101 in FIG. 1 is a form of pressure-transmitter, it may also be considered as a pressure-sensitive member for pressurizing the soap; in this sense the water discharging from the wand provides the pressure and hence the force acting on the inside of the bladder for pressurizing the sealed soap-chamber.

Considering the form of soap-supply means shown in FIG. 8 in the foregoing manner, the force produced by the water-pressure in tube 111 is replaced with the force produced by resilient means independent of tube 37, such as by a spring.

Referring to FIG. 8, a sealed soap-chamber 132 in body 25 is formed by a flexible diaphragm 134 clamped and sealed by a cover 136 forming a second chamber 38 open to the atmosphere through an aperture 140. The diaphragm preferably is made of synthetic rubber, and may alternately comprise a bellows or bag. A spring 142 is mounted in chamber 138 and acts on diaphragm 134 in a direction to apply force on the soap residing in chamber 132, thereby pressurizing the soap. As in the form of FIG. 1, the soap flows through passage 117a, past metering valve 123, check valve 119 and out through discharge-tube 125. Also, a small amount of water is caused to flow from tube 111 and out discharge tube 127, as before.

Figure 14:
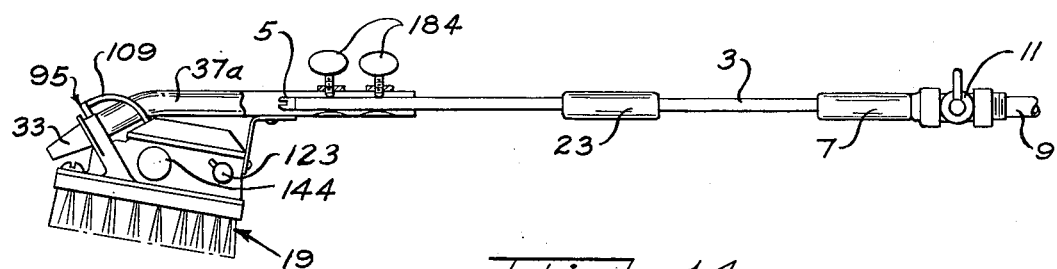
FIG. 14 is an elevational view of another form of the car-wash invention, presently for home-wash operation.

The chamber 132 is filled with soap by laying the device on its side and removing a screw-cap 144 (not shown in FIG. 8 but visible in FIG. 14, to be discussed). Means are provided to enable manual charging or compression of spring 142 to withdraw diaphragm 134 wherein the chamber 132 can be filled with soap. In FIG. 8, the manual charging means comprises a string-like element such as a ball-chain 148 secured at one end to diaphragm 134 and guided by a roller or track 150 supported by cover 136. The other end of the ball chain has a handle for manual operation, such as a ring 152.

Before filling chamber 132, the ring is pulled to raise diaphragm 134 and fully compress spring 142. The chain then is locked by catching one of the balls in the slot of a snap-lock piece 154 similar to snap-lock piece 83 in FIG. 1. Then the cap 144 (FIG. 14) is removed and soap is poured through the large cap-opening communicating with the recess 156 in chamber 132. After the chamber is filled with soap, the cap is sealed tightly and valve 123 is closed. When the car-wash device is ready for use in the washing-operation described above, the ring 152 is first used to release chain 148 from the snap-piece, thereby allowing spring 142 to pressurize the soap. Then for the washing operation, valve 123 is opened to meter just enough soap so the suds are visible, and the car is washed in the same manner as described above. When the wash is finished, valve 123 must be closed at once to stop the soap-flow, and preferably the chain 148 is locked to hold the existing position of spring 142.

In another modification, the form shown in FIG. 8 can be altered to illustrate another variation of the form shown in FIG. 1 in which the bladder 101 is replaced by diaphragm 134. For this modification, as shown in FIG. 14 to be discussed, the spring 142, chain 148, ring 152 and roller 150 are all omitted, and chamber 138 is entirely closed by cover 136. Then tube 109 (shown dotted in FIG. 8, but solid in FIGS. 14 and 15) communicates with chamber 138 for enabling the water-pressure in tube 111 to act on diaphragm 134 in place of the spring 142. The total operation is then the same as described for FIG. 1.

In FIG. 8, a second discharge tube 158 is illustrated as providing additional water for mixing with the soap, and is particularly helpful when the device is held vertically when washing the lower sides of a car. Any desired combinations of a plurality of similar discharge tubes may be provided.

FIGS. 9–11 show modified forms of the pressure or impact-tube 111. In FIG. 9a two orifices or apertures 113a and 113b are shown in open communication in tube 111. Tests to date indicate that with two apertures, a slightly higher pressure is produced in tube 111 for a given flow of water in tube 37 when such higher pressure is desirable. Another means to increase pressure, if necessary, is to provide a pair of ears or flaps 160 as shown in FIGS. 9a and 9b.

The form of tube 111 shown in FIG. 9a, with or without ears 160, may be modified further by providing a partition 162 (shown dotted) separating aperture 113a from aperture 113b. Then the bladder-tube 109 communicates only with one of the two apertures, and the water-discharge tube 127 communicates with the other aperture.

In FIG. 10, means are provided to modulatingly control the pressure transmitted to bladder 101 through tube 109, either selectively or permanently. This concept utilizes the bleed-principle of pressure-control in which two restrictions are in series, and at least one restriction is varied to modulate the pressure between the two restrictions. In FIG. 10, a manual control is illustrated and comprises a lever 164 for rotating a tube 166 telescoping inside of tube 111 and rotatable in relation thereto by the lever. One end of tube 166 is closed, and a sealing means such as an O-ring, may be provided to prevent leakage between the two tubes. The other end of tube 166 includes a valve portion 168 which may comprise merely half of the tube, as illustrated. When lever 164 is manually revolved, the valve portion modulates the amount of opening of aperture 113 to comprise one of the two series restrictions, although variable. Another orifice 170 comprises the second restriction in series, which may comprise merely the smaller water-discharge-tube 127. Water flows through the variable restriction formed by valve 168 and aperture 113, and then through restriction 170 and out through outlet tube 127. The pressure between the two restrictions is modulated to any desired value by moving lever 164, and this pressure is transmitted statically to bladder 101 through tube 109. Similar results can be produced by reversing the orifices, in which restriction 170 is varied by manual means, and aperture 113 is a fixed restriction; or both restrictions can be fixed or variable. The form shown in FIG. 1 tends to operate on this principle since there must be a pressure-drop, as in tube 127, to contain pressure in bladder 101.

Thus the pressure in chamber 105 can be controlled selectively by valve-portion 168 to cause the soap-flow; or the valve 123 may be used to control flow. Tests to date indicate that for lowest cost, valve 123 alone is satisfactory. If more control-range is desired at higher cost, the valve-portion 168 may be used by itself or in addition to valve 123. Valve 168 may alternately be varied by axial movements of tube 166 instead of by rotary movements to produce the desired modulation pressure control.

Another modification is shown in FIG. 10, which may also be used in any of the forms of soap-supply means disclosed herein. Means can be provided to control to some degree the amount of water transmitted into chamber 105 inside the bladder, when desired. In FIG. 10 the flow to the bladder is minimized by a baffle or cover 172 which tends to direct the water-flow through restriction 170 and minimize the water seepage through tube 109 into chamber 105; this is desirable in the forms to be discussed in relation to FIGS. 12 and 13.

In the modification of FIG. 11, a projecting-tube 174 tends to increase the water seepage into chamber 105 which may be desirable when a bladder is used as shown in FIG. 1. When the device is held vertically to fill the bottle 101 with soap, the water-head produces about six inches of vacuum which tends to collapse the bladder and provide the maximum amount of soap-space in the bottle.

Figure 13:
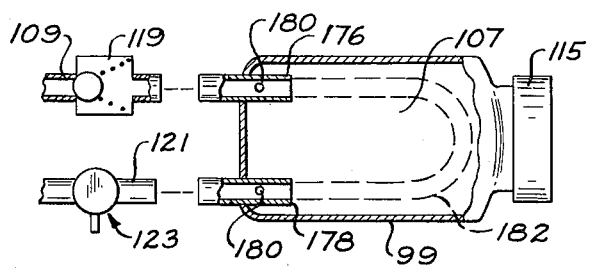
FIG. 13 is a partial-sectional view of another form of the pressure-transmitting soap-container of FIG. 12.

FIGS. 12 and 13 show different forms of pressure-transmitting containers for the soap-supply system in which a bladder or diaphragm is not required. In these pressure-transmitting containers, the bladder can be omitted by using the principle of a fluid manometer in which air can transmit its pressure directly to a liquid as long as the liquid does not spill out any vents or openings.

In FIG. 12, the tube 109 now includes check valve 119 and connects near the top of the bottle at one side as shown. Then the tube 121 leading to valve 123 connects to the bottom of the bottle 99 on the opposite side from the connection of tube 109. The dotted line 99a shows the soap-level when the top surfaces of the car are being cleaned in the car-washing procedure described above. When the pressure from tube 111 through tube 109 bears on "top" of the soap which is forced out through tube 121 at the lowest level. When the device is held vertically to clean the lower sides of the car, the soap-level is shown by the dotted line 99b in which the pressure from tube 111 again bears on top of the soap which is forced out through tube 121 at the "bottom" of the container. When the device is held horizontally (by right-handed operators) for cleaning the upper sides of the car, the soap-level is shown by the dotted line 99c in which the pressure from tube 111 through tube 109 again bears on top of the soap which is forced out through tube 121 at the new bottom of the container. For left-handed operators, another "left-handed" bottle with the connections of tubes 109 and 121 reversed could be made available, but is not essential.

FIG. 13 is substantially the same as FIG. 12 except that both tubes 109 and 121 are connected to one side of the bottom of the container 99. The hose-nipple 176 for tube 109 and the hose-nippleN78 for tube 121 may project within the soap-chamber 107. Both hose-nipples may include one or more holes or openings 180. In FIG. 13 the pressure-transmitting action occurs since nipple 178 would always by covered by soap in all three operating positions of right-handed operators as described above. When the device is held vertically, for example, both hose-nipples are covered by soap wherein the air pressure from tube 109 bubbles to the top and acts to transmit its pressure on top of the soap which is forced out tube 121 at the bottom. For left-handed operators, it is only necessary to reverse the tubes by connecting tube 109 to nipple 178 and tube 121 to nipple 176 without changing bottles.

The forms shown in FIGS. 12 and 13 both become diluted with water by an amount which is acceptable if it is desired to reduce costs. Tests to date indicate that water-dilution in the form of FIG. 13 may be reduced slightly by adding a U-tube 182 (shown dotted) for connecting the nipples 176 and 178, and with the holes 180 open. Also, in both FIGS. 12 and 13, the form of pressure-tap with the baffle 172 (FIG. 10) seems to lower water dilution. The form of pressure-transmitting container shown in FIG. 1 has no water-dilution, but the cost is slightly higher.

FIG. 14 shows a modification of the form of the invention illustrated in FIG. 1, and is presently intended for garden-hoses at somewhat lower cost. In FIG. 14 the tube 37a is rigid, preferably being made of aluminum or magnesium. The tube is large enough for wand 3 to be easily inserted therein with sufficient clearance to enable clamping and removal by quick-clamp means, such as by thumb screws 184 carried by tube 37a. This clearance also permits the use of the sensing means 95 and tube 111 to transmit the water-pressure to the soap-container as described above. The form of soap container illustrated in FIG. 14 includes a sealed diaphragm subjected to the pressure in tube 111 through the tube 109, which has been discussed in relation to the form of soap-supply means shown in FIG. 8. The handle 7 is fixed, and handle 23 is made axially movable but is prevented from rotation by suitable means, such as by a square wand. The operation generally is the same as described for the form of FIG. 1 except for differences now to be discussed.

If the wand 3 is straight as shown in FIG. 14, then the rigid tube 37a must include a straight portion as shown. If the wand is made longer with a bent-portion at the end, then the rigid tube 37a is made shorter with a proper angle for clamping to the bent portion of the wand, as will be discussed in relation to FIG. 15. If desired, the soap-containers or bottles 99 of FIGS. 1, 12 or 13 could be used instead of the form shown in FIG. 14 for reasons described above. For example, the bottle 99 could be mounted either on the lower side of the rigid tube or on top of the brushing means 19.

In the form of the invention shown in FIG. 14 the handles 7 and 23 are both on the same axis. While this form can have a lower cost, it is more difficult to maintain the brushing means in the desired position perpendicular to the surface being cleaned, which is particularly important for women. In the form shown in FIG. 1, a large "rotary leverage" is produced because shaft 17 (with brushing means 19) and its handle 23 is spaced and generally parallel to the wand and its handle 7. Accordingly, the form shown in FIG. 1 provides rotary rigidity and hence is easier to maintain in proper brushing position for many people, especially for women.

Also, the form shown in FIG. 14 cannot be used with present coin-washes with all the varied existing bends and shapes of a plurality of wands. If it were possible for the wands at all coin-washes to be straight, or at least bent the same amount, then the form shown in FIG. 14 would be usable. However in actual practice, even if all the wands are made straight at the start, many wands will be bent inconsistently by customers. Also, only one handle is usually provided on coin-wash wands; in addition the useful rotary leverage factor of the form shown in FIG. 1 would not be present with the form of FIG. 14 at coin-washes. Moreover, with the form of FIG. 14 presently limited only to garden hoses, it cannot be used in winter or on trips at different coin-washes. However, if a large enough portion of the market would never use coin-washes and/or would never travel, a lower-cost version as shown in FIG. 14 can be offered.

It is not practicable for the car-wash device of the present invention, or any kind of brushing means, to be permanently attached to the wand of a coin-wash as a part thereof for general use by all customers. Since the customers would not own the units, each brush would be used by all customers and would not last long. If only a few of the cars were cleaned improperly (without a high-pressure initial water run-off) the brushes would load up with dirt or tar and scratch the paint, especially if frayed bristles are used. Also, if the units were attachable and furnished at coin-washes, they would disappear quickly. The only practical manner for utilizing the present invention at coin-washes is for each customer to purchase and use his own attachable unit, so that the brush is used only on his car.

It is important to appreciate that both forms of the invention (FIGS. 1 and 14) could be modified to discharge the rinse-water from tubes 37 or 37a in directions other than shown. In order to provide simultaneous rinsing and washing operations, it is only necessary for the water to discharge on an area adjacent the brushing area but in a direction away from the general advancement of the brush. For example, in FIG. 1 the rinse-water from tube 37 could discharge at one side instead of at the end as shown. Then the washing movements would be back and forth, while the brush would be advanced sideways away from the rinse-water discharge. However, at the present time the form shown in FIG. 1 and its corresponding technique appear simpler.

Figure 15:
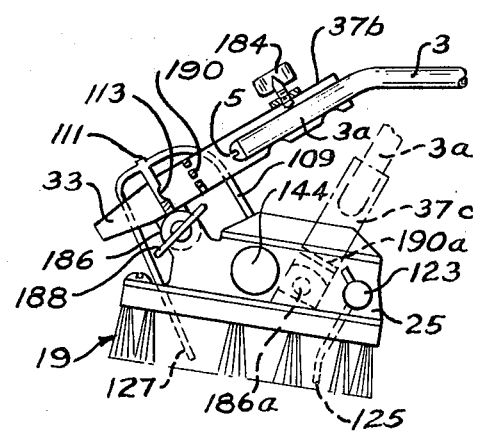
FIG. 15 is an elevational view showing a simplified form of the car-wash device of FIG. 1.

In FIG. 15 a simplified form of the car-wash device of FIGS. 1 and 14 is illustrated. In this alternate form, the conduit or rigid tube 37b includes a portion of a suitable hinge means 186 which cooperates with another portion of the hinge means extending from the body 25 to enable selective angular adjustment of the tube 37b in relation to the brush 19. The hinge means 186 is constructed and arranged to include means for manually locking the tube in any selected angle in relation to the brush, as by a thumb screw 188, for use at coin-washes having wands of varied tip angles.

The rigid tube 37b includes another thumb screw 184 for clamping the assembly of the tube and brush to the bent portion 3a of wand 3 in the same manner as for the form of FIG. 14, with tube 37b open at its inlet end to prevent back-pressure. Hence, in FIG. 15 the tube can be shorter because it clamps only to the bent portion of wand 3, while the hinge-means 186 enables the device to accommodate most angles of the bent portions of a plurality of wands. The tubes 127 and 109 are both connected to tube 111 at one end, and tube 111 is plugged at its opposite end. The tubes 109 and 127 are preferably made of a flexible material (such as rubber) to enable the angular adjustment at hinge means 186. The body 25 is the same as shown in FIGS. 8 and 14, in which diaphragm 134 is operated only by the pressure of the water impinging against the aperture 113 in tube 111. However, the pressure-transmitting system which includes a bottle 99, as shown in FIGS. 1, 12 and 13, might alternately be used.

In FIG. 15, the jet 5 is very close to the aperture 113 and nozzle 33; this condition might cause excessive nozzle velocities and excessive pressures in tube 111. Means are provided to retard the water-velocity at the discharge nozzle in FIG. 15, as done by the line-loss of the long flexible tube 37 in the form shown in FIG. 1. In FIG. 15 the retarder means comprises an aperture member 190, such as a screen or plate having a plurality of suitable holes. The form shown in FIG. 15 can be used at a coin-wash, and also for a home wash with a wand having a bent portion 3a, to provide simultaneous wash and rinse.

In a simpler but more limited form of the device alternately illustrated in FIG. 15 (shown dotted), the hinge means 186a may be connected directly to the brush without the separate soap-supply means. Then the wand 3a is inserted into the tube 37c with its open inlet end, and the thumb screw 184 (not shown dotted) secures tubes 37c to wand-portion 3a. In this alternate construction having an angle-adjustment, the soap-water mixture at a coin-wash discharges directly into the brush area through a retarder 190a and then through suitable holes provided in the brush head (not shown); and the open tube and clamp-means enables a quick attachment of the brush at any selected angle. However with this alternate form, the three washing operations must be performed separately which extends the time and cost of the coin-operation. Also at a coin-wash, a car-wax would all be removed by the strong coin-wash soap in the first wash, since a separate soap-supply would not be available. In addition, it would be necessary to add soap-supply means to the wand for home washers if a soap-feed system is omitted from the attachable unit.

The difficulty of supplying soap properly in present home-washers has been discussed, in which the relatively high water pressure results in excess water-dilution and wasted soap wherein the soap chamber must be filled frequently.

Figure 16:
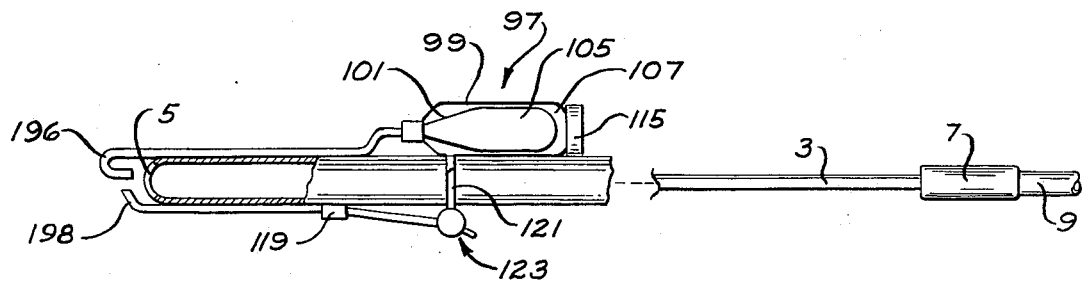
FIG. 16 is an elevational partly enlarged view showing the soap-supply means of FIG. 1 as part of a jet-washer.

I have recognized that the soap-supply means, per se, as disclosed herein can be very useful in other types of devices. For example, it is beneficial in a jet-washer combination which is often used for house windows, screens, patio-furniture, and other applications not subjected to road-film. FIG. 16 shows an improved jet-washer which includes the novel soap-supply means shown in FIG. 1. In FIG. 16, the jet-washer comprises the wand 3 with handle 7 and supply-hose 9 for discharging water out through the jet 5. The bottle 99 is suitably attached to any portion of the wand, and includes the bladder 101. A rigid impact or pitot tube 196 is mounted to be subjected to the velocity-pressure of the water after discharging from jet 5. This velocity-pressure is transmitted inside the bladder to pressurize soap in chamber 107 in the same manner as for the form shown in FIG. 1, wherein the soap from chamber 107 flows past metering-valve 123, check-valve 119 and out a discharge tube 198 where it joins the water discharging from jet 5. The operation of the soap-supply system is otherwise the same as for FIG. 1. The bottle 99 can be mounted at any desired position on the wand portion 3, such as near the handle if the connecting tubes 196 and 198 are made longer.

The soap-supply concept disclosed herein may also be used to control the flow of any fluid (but particularly a liquid) at low pressure in response to the discharge velocity of a high-pressure fluid (but particularly a liquid) after it flows from the discharge orifice.

Figure 17:
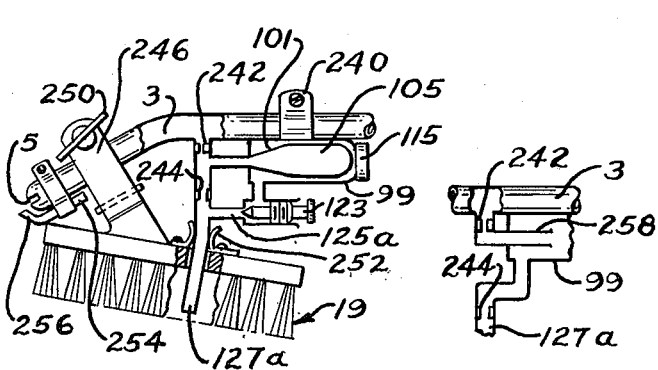
FIG. 17 is a semi-diagrammatic elevational view of a car-wash device for use in jet-washers and with a removable brush, and which includes another form of low-pressure soap-supply system.

In the forms of the invention shown in FIGS. 1–16, the sensing means and associated soap-supply system actually includes means to provide a drastic reduction of pressure (to about 15–25 inches of water) in relation to the high-pressure of the water-source (up to 20,000 inches of water). This low soap-presure enables the passages and orifices in the soap-flow circuit to be as large as possible to avoid dirt-plugging and also to save soap. In FIG. 1, the aperture 113 receives the pressure of the liquid emitting from jet 5 to provide the desired low-pressure. In FIG. 17, a second system for providing this desired large pressure-reduction is illustrated in a jet-washer combination, although this pressure-reducing system can also be used to provide soap-flow, or other liquid flow in response to the flow of any other first fluid.

Referring to FIG. 17, which is semi-diagrammatic, a jet-washer wand 3 is illustrated with means for manually attaching a brush thereto. The wand includes means to provide soap, either solely to the brush area for enabling simultaneous wash and rinse or to the jet-washer discharge when the brush is removed and the jet-washer is used alone. In FIG. 17a the bottle 99, which again includes the sealed bladder 101, is permanently secured to wand 3 by suitable clamping means 240. The bottle is filled with soap and sealed by the cap 115 and is operated by the low pressure in chamber 105, all as described above in relation to FIG. 1. However, in FIG. 17a the low pressure is provided by a branch dynamic fluid-bleed circuit connected at one end directly to the high source pressure, as in wand 3, and at its outlet end to a very low pressure such as the atmosphere. The branch bleed-circuit includes two fluid-restrictions 242 and 244; and the bladder on one side thereof (illustrated as interior chamber 105) communicates with the circuit at a point between the restrictions. In the dynamic bleed of liquid through the circuit, restriction 242 causes a first pressure-drop to a low value while restriction 244 causes this lower pressure to drop to atmospheric pressure. The amount of pressure between the restrictions is determined by the apertures thereof in the dynamic system. The two restrictions are selected to provide the desired low pressure (10–25 inches of water) for operating the bladder in which restriction 242 is usually smaller than restriction 244. The discharge-tube 127a is flexible, as provided by rubber. The low pressure acting on the bladder causes soap to flow through valve 123, passage 125a, and then into passage 127a to pre-mix with water; or the soap could discharge separately to the brushing area as shown in FIG. 1, since the passages 127a and 125a are large enough to provide substantially atmospheric discharge pressure. A check-valve may be provided after (or before) the valve 123, as shown in FIG. 1.

The brush 19 is secured to wand 3 by suitable clamping means 246 which might include a clamping element swingable about a hinge pin and locked by a thumbscrew 250, as illustrated. When the brush is clamped to the wand, the flexible tube 127a is inserted through the brush and retained by the light friction-force of a pair of spring-clips 252. As an alternative, a hose-nipple might project from the top of the brush and include a discharge passage, wherein the flexible tube 127a would be slipped over the hose-nipple. When the brush is attached as illustrated, the device is operated to wash and rinse simultaneously in a manner described for FIG. 1. As described above, this combined operation would be preceded by an initial run-off operation with the wand by itself using either water alone or soap and water. For this initial operation, the brush is removed by turning thumb screw 250, and the flexible tube 127a is pushed onto a hose-nipple 254 to discharge the branch-circuit water (and soap if valve 123 is open) into the stream from jet 5 through a nozzle 256 which is clamped to the wand by suitable clamping means. Since FIG. 17 is somewhat diagrammatic, in practice the bottle 99 would be mounted on the wand closer to the handle wherein the flexible tube 127a can be long enough for easy transfer from the brush to the hose nipple 254, and conversely.

Hence the device of FIG. 17 can be used with a garden hose in a manner described in relation to FIG. 1 with an initial run-off, and then the brush is attached for simultaneous wash and rinse; or the device can be used without the brush solely as a jet-washer with soap supplied through the nozzle 256. The jet-washer of FIG. 16 can be arranged to provide similar options as disclosed in FIG. 17, in which a small flexible hose would connect the check-valve 119 to the nozzle 198 or to a brush 19 (not shown) attached selectively, as disclosed in FIG. 17a.

For the form shown in FIG. 17, the pressure-transmitter system disclosed in FIGS. 12 and 13 could be used in place of bladder 101. Also, FIG. 17b shows a modified form of soap-supply means without a bladder in which the bottle 99 is connected directly in the circuit between the two restrictions. In this modification, the total water-flow from restriction 242 passes into the bottle from tube 258 and out with some soap through restriction 244.

What I claim is:

1. In a manually-operated device for cleaning the surface of a car in a car-washing process in which a source of pressurized water is supplied through a flexible hose, said car-washing process including at least a washing operation and a rinse operation, wand means operatively connected to said hose and including a rigid tube-portion having jet means at the end thereof for discharging water at high velocity, and including another portion adapted to be manually held by the operator of said device, the combination comprising: brushing means operatively associated with said wand means for loosening the dirt on said car-surface during said washing operation; soap-supply means operatively associated with said brushing means to provide a flow of soap to the area of said brushing means; and said soap-supply means including means sensing the pressure of the water after discharging from said jet means to cause said flow of soap.

2. The combination of means defined in claim 1, and said soap-supply means including pressure-transmitter means to transmit said sensing-pressure to said soap; and said pressure-transmitter means including flexible pressure-sensitive means to separate said soap from said sensing-pressure and to transmit said sensing-pressure to said soap for effecting said flow thereof.

3. In a manually-operated device for cleaning the surface of a car in a car-washing process in which a source of pressurized water is supplied through a flexible hose, said car-washing process including at least a washing operation and a rinse operation, wand means operatively connected to said hose and including a rigid tube-portion having jet means at the end thereof for discharging water at high velocity, and including another portion adapted to be manually held by the operator of said device, the combination comprising: brushing means operatively associated with said wand means for loosening the dirt on said car-surface during said washing operation; soap-supply means operatively associated with said brushing means to provide a flow of soap to the area of said brushing means; said soap-supply means including means sensing the pressure of the water after discharging from said jet means to cause said flow of soap; and said soap-supply means including pressure-transmitter means to transmit said sensing-pressure to said soap for effecting said flow thereof.

4. In a manually-operated device for cleaning the surface of a car in a car-washing process in which a source of pressurized liquid comprising at least water is supplied through a flexible hose, said car-washing process including at least a washing operation and a rinse operation, wand means operatively connected to said hose and including a rigid tube-portion having jet means at the end thereof for discharging liquid at high velocity, and including another portion adapted to be manually held by the operator of said device, the combination comprising: brushing means operatively associated with said wand means for loosening the dirt on said car-surface during said washing operation; conduit means operatively associated with said brushing means and cooperating with said wand means for conducting said liquid-flow emitting from said jet means to discharge on an area of said car-surface and cooperate with said brushing means during said car-washing operation; attachment means including clamping means for operatively connecting said brushing means to said wand means or for removal therefrom for enabling said last two means to operate as an integral unit during said washing operation; soap-supply means to feed soap to the area of said brushing means; pressure-sensing means in said conduit means associated with said soap-supply means and subjected to the pressure of said liquid in said conduit means after emitting from said jet means, and to transmit at least a portion of said last-named pressure to said soap-supply means for causing said feeding of said soap to said brushing means area when liquid flows through said conduit means.

5. In a manually-operated device for cleaning the surface of a car in a car-washing process in which a source of pressurized water is supplied through a flexible hose, said car-washing process including at least a washing operation and a rinse operation, wand means operatively connected to said hose and including a rigid tube-portion having jet means at the end thereof for discharging water at high velocity, and including another portion adapted to be manually held by the operator of said device, the combination comprising: brushing means operatively associated with said wand means for loosening the dirt on said car-surface during said washing operation; conduit means operatively associated with said brushing means and cooperating with said wand means to conduct said water-flow emitting from said jet means for discharging continuously on an area of said car-surface adjacent but clear of the area of said brushing means, while said brushing means is moved away from said water-discharge by said operator, for performing said rinsing operation simultaneously with said washing operation; attachment means including clamping means for operatively connecting said brushing means to said wand means or for removal therefrom for enabling said last two means to operate as an integral unit during said washing operation; pressure sensing means in said conduit means subjected to the pressure of said water after emitting from said jet means; and soap-supply means associated with said sensing means to feed soap to said brushing means area in response to at least a portion of said last-named sensing water-pressure when water flows through said conduit means.

6. The combination of means defined in claim 5 in which said wand means comprises one of varied shapes; and said conduit means comprising flexible tubing means having an end-portion open permanently and including an aperture sufficiently larger then said wand means to enable unrestricted and quick manual insertion thereof into said tubing means by said operator; said tubing means being sufficiently flexible to accommodate said varied shapes of a plurality of said wand means when same is manually inserted in said tubing means by said operator.

7. The combination of means defined in claim 5, and passage means communicating with said sensing means to conduct a small portion of said water from said conduit means to said brushing means area; said soap-supply means including means discharging said soap to said brushing means area; and said brushing means including a brush member having bristles with frayed ends to retain the soap during said washing operation for enabling proper use of said soap and said small water-portion during said washing operation.

8. The combination of means defined in claim 5, in which said wand means comprises one of varied shapes; said clamping means comprising manually-operated quick-clamp means for enabling said operator to quickly attach said brushing means to said wand means and to quickly remove said brushing means therefrom for rapidly cleaning said car in said process; and said conduit means including flexible tubing means to accommodate said varied shapes of a plurality of said wand means when same is manually inserted in said tubing means by said operator upon connecting said attachment means to said wand means; shaft means having said attachment means connected thereto substantially at one end thereof and said brushing means connected thereto substantially at the other end thereof for positioning said brushing means sufficiently beyond said wand means to enable easy operation of said device in said car-washing process; said quick-clamp means being constructed and arranged to secure to said wand means the entire attachable assembly of said attachment means, said shaft means, said brushing means and said flexible tubing means; said wand means and said cooperating tubing means being substantially in the same plane and spaced and generally parallel in relation to said shaft means when said attachable assembly is secured to said wand means.

9. In a manually-operated device for cleaning the surface of a car in a car-washing process in which a source of pressurized water is supplied through a flexible hose, said car-washing process including at least a washing operation and a rinse operation, wand means operatively connected to said hose and including a rigid tube-portion having jet means at the end thereof for discharging water at high velocity, and including another portion adapted to be manually held by the operator of said device, the combination comprising: brushing means operatively associated with said wand means for loosening the dirt on said car-surface during said washing operation; conduit means operatively associated with said brushing means and cooperating with said wand means to conduct said water-flow emitting from said jet means for discharging continuously on an area of said car-surface adjacent but clear of the area of said brushing means, while said brushing means is moved away from said water-discharge by said operator, for performing said rinsing operation simultaneously with said washing operation; attachment means including clamping means for operatively connecting said brushing means to said wand means or for removal therefrom for enabling said last two means to operate as an integral unit during said washing operation; pressure sensing means including an impact orifice in said conduit means exposed to the pressure of said water after emitting from said jet means; soap-supply means to store soap and to feed same to said brushing means area; and pressure-transmitter means communicating with said orifice to transmit at least a portion of said pressure to said soap in said soap-supply means for causing said feeding of said soap to said brushing means area; and passage means communicating with said orifice to conduct a small portion of said water from said conduit means to said brushing means area for mixing with said soap fed to said brushing means area.

10. In a manually-operated device for cleaning the surface of a car in a car-washing process in which a source of pressurized liquid is comprising at least water supplied through a flexible hose, said car-washing process including at least a washing operation and a rinse operation, wand means operatively connected to said hose and including a rigid tube-portion having jet means at the end thereof for discharging liquid at high velocity, and including another portion adapted to be manually held by the operator of said device, the combination comprising: brushing means operatively associated with said wand means for loosening the dirt on said car-surface during said washing operation; and soap-supply means to store soap and to feed same to said brushing means area; said soap-supply means including a flexible pressure-sensitive member to enclose and contain said stored supply of soap; and said soap-supply means also including means to produce forces acting on said pressure-sensitive member for pressurizing said soap to cause said feeding thereof.

11. The combination of means defined in claim 10; and conduit means operatively associated with said brushing means and cooperating with said wand means for conducting said liquid-flow emitting from said jet means to discharge on an area of said car-surface and cooperate with said brushing means during said car-washing operation; and said means to produce forces including pressure-sensing means in said conduit means means subjected to the pressure of said liquid in said conduit means after emitting from said jet means, and to transmit continuously at least a portion of said last-named pressure to said pressure-sensitive member for applying said forces thereon to pressurize said soap and cause said feeding thereof.

12. In a device for cleaning a surface having dirt thereon in which a source of pressurized liquid is supplied for use in said cleaning, the combination comprising: a member operatively associated with said liquid source and including jet means for discharging said liquid; and soap-supply means operatively associated with said member to feed soap to said surface in response to the pressure of the liquid after discharging from said jet means.

13. The combination of means defined in claim 12, and a fluid circuit communicating with said response-pressure; inlet and outlet orifices in said circuit; and said soap-supply means including pressure-transmitter means communicating with said circuit at a point between said two orifices to transmit the pressure therein to act on said soap in said soap-supply means for causing said feeding thereof to said surface.

14. In a device for cleaning a surface having dirt thereon in which a source of pressurized liquid comprising at least water is supplied for use in said cleaning, the combination comprising: a member operatively associated with said liquid source and including jet means at an end thereof for discharging said liquid; and soap-supply means operatively associated with said member to automatically feed soap to said surface in response to the pressure of the liquid after discharging from said jet means; said soap-supply means including flexible pressure-sensitive means enclosing said soap and communicating with said pressure of said liquid after discharging from said jet means to transmit said pressure to said soap for causing said feeding thereof to said surface.

15. In a device for cleaning a surface having dirt thereon in which a source of liquid comprising at least water is supplied at high pressure for use in said cleaning, the combination comprising: a member operatively associated with said liquid source and including means for discharging liquid at high velocity as a result of said high pressure; pressure-reducing means operatively associated with said liquid to produce a pressure significantly lower than said source-pressure; and soap-supply means communicating with said pressure-reducing means to feed soap to said surface in response to said lower pressure, and in which all elements of said soap-supply means are subjected to pressures no higher than said lower pressure; said soap-supply means having relatively large orifices and passages associated therewith as a result of said lower pressure to avoid undesirable restriction by foreign matter of said feeding of said soap.

16. The combination of means defined in claim 15, and said soap-supply means including pressure-transmitter means communicating with said lower pressure for transmitting same to said soap for causing said feeding thereof to said surface; and said soap-supply means being adapted to feed soap automatically in response to said lower pressure.

17. In a manually operated device for cleaning a surface having dirt thereon in which a source of pressurized water is supplied through a flexible hose for use in said cleaning, said cleaning process including a washing operation using soap and water and a rinse operation using water, wand means operatively connected to said hose and including a rigid tubular portion having jet means at an end thereof for emitting water at high velocity and having a manual portion adapted to be held by the operator of said device; the combination comprising: brushing means operatively associated with said wand means for loosening said dirt on said surface during said washing operation; conduit means operatively associated with said brushing means and cooperating with said wand means to conduct said water-flow emitting from said jet means for discharging continuously on an area of said surface adjacent but clear of the area of said brushing means, while said brushing means is moved away from said water-discharge by said operator, for performing said rinsing operation simultaneously with said washing operation; attachment means for operatively connecting said brushing means to said wand means or for removal therefrom for enabling said last two means to operate as an integral unit during said washing operation; said conduit means including tubing means having an end-portion open permanently and including an aperture sufficiently larger than said wand means to enable unrestricted and quick manual insertion thereof into said tubing means by said operator upon connecting said attachment means to said wand means; and soap-supply means operatively associated with said conduit means to feed soap automatically to the area of said brushing means in response to the velocity pressure of the water in said tubing means after discharging from said jet means.

18. The combination of means defined in claim 17, in which said wand means comprises one of varied shapes; and said conduit means comprising flexible tubing means having sufficient flexibility to accommodate said varied shapes of a plurality of said wand means when same is manually inserted in said tubing means by said operator upon connecting said attachment means to said wand means; and said conduit means including a discharge-nozzle at its outlet end having an opening in relation to said aperture to prevent back-pressure of said water from causing reverse water flow out said inlet aperture during said washing operation while discharging water at a velocity lower than said water-velocity emitting from said jet means; and said soap-supply means including pressure-sensing means in said conduit means physically separate from said wand means and subjected to said velocity pressure of said water in said conduit means after emitting from said jet means and to provide the pressure causing said feeding of said soap to said brushing means area.

19. The combination of means defined in claim 1, and said soap-supply means including a container having pressure-sensitive means therein communicating with said sensing-means pressure; said pressure-sensitive means comprising a flexible bladder mounted in said container to separate said pressure from said soap; said bladder having one side exposed to said pressure and its other side contacting the supply of soap for transmitting said pressure thereto; passage means for conducting said soap from said container when pressurized by said bladder to discharge in said area of said brushing means.

20. In a manually-operated device for cleaning the surface of a car in a car-washing process in which a source of pressurized water is supplied through a flexible hose, said car-washing process including at least a washing operation and a rinse operation, wand means operatively connected to said hose and including a rigid tube-portion having jet means at the end thereof for discharging water at high velocity, and including another portion adapted to be manually held by the operator of said device, the combination comprising: brushing means operatively associated with said wand means for loosening the dirt on said car-surface during said washing operation; soap-supply means operatively associated with said brushing means to provide a flow of soap to the area of said brushing means; said soap-supply means including a chamber filled with soap; a flexible member comprising at least a portion of a wall of said chamber; passage means connecting said chamber to said area of said brushing means for conducting soap to the car-surface; and resilient force-producing means acting on said flexible member for pressurizing said soap to cause said soap-flow.

21. In a device for cleaning a surface having dirt thereon in which a source of pressurized liquid is supplied for use in said cleaning, the combination comprising: a member operatively associated with said liquid source and including jet means for discharging said liquid at high velocity; pressure-sensing means including an orifice in the direct flow-path of the liquid after discharging from said jet means to be subjected to the pressure of said last-named liquid; and soap-supply means communicating with said orifice to feed soap to said surface in response to said pressure of the liquid after discharging from said jet means.

22. In a device for cleaning a surface having dirt thereon in which a source of pressurized water is supplied for use in said cleaning, the combination comprising: a member operatively associated with said water source and including jet means for discharging said water at high velocity; pressure-sensing means including an orifice in the direct flow-path of the water after discharging from said jet means to be subjected to the impact pressure of said last-named water; soap-supply means communicating with said orifice to feed soap continuously to said surface in response to said impact pressure of the water after discharging from said jet means; and said soap-supply means including pressure-transmitter means communicating with said orifice to transmit said pressure to said soap for causing the continuous feeding thereof to said car-surface.

23. In a device for cleaning a surface having dirt thereon in which a source of pressurized liquid comprising at least water is supplied for use in said cleaning, the combination comprising: a member operatively associated with said liquid source and including jet means for discharging said liquid; soap-supply means operatively associated with said member to feed soap to said surface in response to the pressure of the liquid after discharging from said jet means; said soap-supply means including pressure-transmitter means communicating with said response-pressure for transmitting same to said soap for causing said feeding thereof; said pressure-transmitter means including a container filled with soap having an inlet-pressure port and associated passage means communicating with said response-pressure and an outlet soap port and associated passage means for the flow of said soap feeding to said car-surface, and said two ports being constructed and arranged in relation to said container and said device to cause said response-pressure effectively to act on top of said soap by direct physical contact therewith in substantially all normal operating positions of said device.

24. The combination of means defined in claim 23, and unidirectional check valve means in said first-named passage means connecting said inlet-pressure port and said response-pressure to prevent said soap from spilling out through said passage means when said device is not in use; and restricting means in said second-named passage means for metering said flow of soap to said surface.

25. In a manually-operated device for cleaning the surface of a car in a car-washing process in which a source of pressurized water is supplied through a flexible hose, said car-washing process including at least a washing operation and a rinse operation, wand means operatively connected to said hose and including a rigid tube-portion having jet means at the end thereof for discharging water at high velocity, and including another portion adapted to be manually held by the operator of said device, the combination comprising: brushing means operatively associated with said wand means for loosening the dirt on said car-surface during said washing operation; means to supply continuously a small quantity of water to the area of said brushing means; soap-supply means operatively associated with said brushing means to discharge soap automatically to the area of said brushing means for mixing with said small quantity of water to help said loosening of said dirt during said washing operation; attachment means for operatively connecting said brushing means to said wand means or for removal therefrom for enabling said last two means to operate as an integral unit during said washing operation; said device having an attachable portion including the assembly of at least said brushing means, said soap-supply means and said attachment means; said attachable portion being constructed and arranged to carry said soap-supply means physically separate from said wand means; said attachment means including conduit means operatively connected to said brushing means and cooperating with said wand means to conduct said water-flow emitting from said jet means for discharging continuously on an area of said car-surface adjacent but clear of said brushing means area, while said brushing means is moved away from said water discharge by said operator, for performing said rinsing operation simultaneously with said washing operation; said conduit means including rigid tubing means open permanently at its inlet end to enable unrestricted and quick manual insertion therein of said wand means; and said tubing means including manually-operated clamping means for enabling said operator to attach said rigid tubing means with said brushing means to said wand means and to remove same therefrom for cleaning said car in said process.

26. In a manually-operated device for cleaning the surface of a car in a car-washing process in which a source of pressurized water is supplied through a flexible hose, said car-washing process including at least a washing operation and a rinse operation, wand means having one of varied shapes and operatively connected to said hose and including a rigid tube-portion having jet means at the end thereof for discharging water at high velocity, and including another portion adapted to be manually held by the operator of said device, the combination comprising: brushing means operatively associated with said wand means for loosening the dirt on said car-surface during said washing operation; rigid conduit means operatively associated with said brushing means and cooperating with said wand means to conduct said water-flow emitting from said jet means for discharging on an area of said car-surface for cooperating with said brushing means during said washing operation; attachment means for operatively connecting said conduit means to said wand means or for removal therefrom for enabling said brushing means and said wand means to operate as an integral unit during said washing operation; and angle-adjusting means directly connecting said conduit means and said brushing means for enabling manual adjustment by said operator of the angle of said brushing means in relation to said conduit means to accommodate said varied shapes of a plurality of said wand means.

27. In a device for cleaning a surface having dirt thereon in which a source of pressurized water is supplied through a flexible hose for use in said cleaning, the combination comprising: wand means operatively connected to said flexible hose and including jet means at an end thereof for discharging water; soap-supply means operatively associated with said wand means to feed soap to said surface in response to the impact pressure of the water after discharging from said jet means; means for mounting said soap-supply means on said wand means to be carried thereby; an impact orifice also carried by said wand means adjacent said jet means and communicating with said soap-supply means to provide said impact pressure thereto; and said soap-supply means including soap-discharge means mounted on said wand means to discharge said soap into said water discharging from said jet means.

28. In a device for cleaning a surface having dirt thereon in which a source of water is supplied at relatively high pressure through a flexible hose for use in said cleaning, the combination comprising: a member operatively connected to said flexible hose and including jet means for discharging water at high velocity as a result of said high pressure; a fluid circuit communicating with said source pressure and subjected to said high pressure thereof; said circuit including two restrictions to provide a pressure between said restrictions significantly lower than said source pressure; soap-supply means communicating with said circuit at a point between said restrictions to feed soap in response to said lower pressure of the water.

29. The combination of means defined in claim 28, and said soap-supply means including flexible pressure-sensitive means enclosing said soap and communicating with said lower circuit pressure for transmitting same to said soap for causing said feeding thereof to said surface.

30. In a mutually-operated device for cleaning the surface of a car in a car-washing process in which a source of water at relatively high pressure is supplied through a flexible hose, said car-washing process including at least a washing operation and a rinse operation, the combination comprising: wand means operatively connected to said hose and including a rigid tube-portion having jet means at the end thereof for discharging water at high velocity, and including another portion adapted to be manually held by the operator of said device; brushing means operatively associated with said wand means for loosening the dirt on said car-surface during said washing operation; soap-supply means operatively associated with said brushing means to provide a flow of soap to the area of said brushing means; a fluid circuit communicating with said source pressure and subjected to said high pressure thereof; said circuit including two restrictions to provide a pressure between said restrictions significantly lower than said source pressure; said soap supply means including communicating with said circuit at a point between said restrictions to cause said soap-flow in response to said lower pressure; said soap-supply means having relatively large orifices and passages associated therewith as a result of said lower pressure to avoid undesirable restriction by foreign matter of said feeding of said soap.

31. In a manually-operated device for cleaning the surface of a car in a car-washing process in which a source of pressurized water at relatively high pressure is supplied through a flexible hose, said car-washing process including at least a washing operation and a rinse operation, the combination comprising: wand means operatively connected to said hose and including a rigid tube-portion having jet means at the end thereof for discharging water at high velocity, and including another portion adapted to be manually held by the operator of said device; brushing means operatively associated with said wand means for loosening the dirt on said car-surface during said washing operation; soap-supply means operatively associated with said brushing means to provide a flow of soap to the area of said brushing means; a fluid passage communicating with said source pressure and subjected to said high pressure thereof; said passage including means to provide a significantly lower pressure than said high pressure but responsive thereto; said soap-supply means including means communicating with said passage to cause said soap-flow in response to said lower pressure; attachment means including clamping means for securing said brushing means to said wand means or for removal therefrom for enabling said last two means to operate as an integral unit; said passage including a flexible discharge portion adapted selectively to discharge soap to said water emitting from said jet means when said brushing means is removed from said wand means or to discharge to the area of said brushing means when same is attached to said wand means; said wand means and said jet means being constructed and arranged in relation to said brushing means when attached thereto to conduct said water-flow emitting from said jet means for discharging continuously on an area of said car-surface adjacent but clear of said brushing means area, while said brushing means is moved away from said water-discharge by said opertor, for performing said rinsing operation simultaneously with said washing operation.

32. In a device having a flow of a first fluid which causes a second fluid to flow in response to the flow of said first fluid, the combination comprising: a member operatively associated with said first fluid and including jet means for discharging said first fluid at high velocity; and means operatively associated with said member to cause a flow of said second fluid in response to the impact pressure of said first fluid after discharging from said jet means.

33. In a device for cleaning a surface having dirt thereon in which a source of liquid is supplied under pressure through a conduit for use in said cleaning, the combination comprising: a member operatively associated with said liquid source and said conduit and including jet means for discharging liquid at high velocity; a second conduit communicating with said source pressure for providing a second simultaneous liquid discharge; and soap-supply means responsive to the flow of liquid through said first conduit and said member for causing the flow of soap to said second conduit to help loosen said dirt on said surface.

34. The combination of means defined in claim 1, and conduit means operatively associated with said brushing means and cooperating with said wand means to conduct said water-flow emitting from said jet means for discharging continuously on an area of said surface; and said conduit means including tubing means having an end-portion open permanently and including an aperture substantially larger than said wand means.

35. The combination of means defined in claim 1, and said soap-supply means including presussure-transmitter means to transmit said sensing pressure to said soap for effecting said flow thereof; conduit means operatively associated with said brushing means and cooperating with said wand means to conduct said water-flow emitting from said jet means for discharging continuously on an area of said surface adjacent but clear of said brushing means area; said conduit means including tubing means having an end-portion open permanently and including an aperture substantially larger than said wand means; said conduit means including nozzle means for directing said water-discharge to said car-surface clear of said brushing means but adjacent the end thereof furthest from the manually-held portion of said wand means, for enabling said operator to actuate the brushing means in reciprocating movements transverse to the direction of said water-discharge to perform said washing operation while said water-discharge simultaneously rinses a previously-cleaned area of said surface as the operator advances said brushing means away from the direction of said water-discharge to wash a new area of said surface; and said nozzle means having an opening in relation to said aperture to prevent back-pressure of said water from causing reverse water-flow out said aperture during said washing operation; and a branch passage communicating with said tubing means to supply continuously a small quantity of water to said brushing means area for mixing with said soap-flow.

36. The combination of means defined in claim 20, and paid flexible member includes rubber-like material; attachment means including clamping means for operatively connecting said brushing means to said wand means or for removal therefrom for enabling said last two means to operate as an integral unit during said washing operation; and means operatively connecting said soap-supply means to said attachment means to render said soap-supply means physically separate from said wand means; and said resilient means comprising spring means.

37. The combination of means defined in claim 20, and attachment means including clamping means for operatively connecting said brushing means to said wand means for enabling said last two means to operate as an integral unit during said washing operation; conduit means operatively associated with said brushing means and cooperating with said wand means to conduct said water-flow emitting from said jet means for discharging remotely therefrom and continuously on an area of said car-surface adjacent but clear of said brushing means area, while said brushing means is moved reciprocally in a direction transverse to the direction of said remote discharge as said device is advanced away from said water-discharge by said operator, for performing said rinsing operation simultaneously with said washing operation; a branch passage communicating with said conduit means between said jet means and said remote discharge to supply continuously a small quantity of water to said brushing means area for mixing with said soap flow thereto; and means operatively connecting said soap-supply means to said attachment means and said brushing means to render said soap-supply means physically separate from said wand means.

38. The combination of means defined in claim 1, and said soap-supply means including pressure-transmitter means to transmit said sensing-pressure to said soap for effecting said flow thereof; conduit means operatively associated with said brushing means and cooperating with said wand means to conduct said water-flow emitting from said jet means for discharging remotely therefrom and continuously on an area of said surface; and a branch passage communicating with said conduit means to supply continuously a samll quantity of water to said brushing means area for mixing with said soap; said branch passage including an inlet restriction subjected to said sensing pressure and an outlet restriction; said pressure-transmitter means communicating with said branch passage between said two restrictions.

39. The combination of means defined in claim 23, and an orifice subjected to said response-pressure; another passage communicating with said orifice for emitting to said car-surface at least a portion of said liquid discharging from said jet means for mixing with said soap feeding to said surface; said other passage including a restriction; said first-named associated passage means communicating with said other passage between said orifice and said restriction; and shield means to cover but not seal said communication of said first-named passage means with said other passage to guide said liquid in said other passage toward said restriction and away from said first-named passage means, but to enable said response-pressure to be transmitted to said inlet-pressure port with minimum see page of said liquid to said pressure-transmitter means.

40. The combination of means defined in claim 23, and said inlet-pressure port being positioned in one extremity of said container to be substantially free of actual contact with said soap but effective to apply said response-pressure in direct physical contact with the top of said soap in all normal operating positions of said device; and said outlet soap port being positioned at an opposite extremity of said container to be always covered by the soap therein and located substantially where the last portion of soap would leave said container in all normal operating positions of said device.

41. The combination of means defined in claim 5, and said soap-supply means including pressure-transmitter means to transmit said sensing-pressure to said soap for effecting said feeding thereof; said pressure-transmitter means including a container filled with soap; said soap-supply means including passage means subjected to said sensing-pressure to transmit same to said container; said container including an inlet-pressure port communicating with said passage means and located in a position effectively to apply said sensing-pressure on top of said soap by direct physical contact therewith in substantially all normal operating positions of said device; and said container including a soap outlet port located therein to be always covered by said soap and substantially where the last portion of soap would leave said container in all normal operating positions of said device.

42. The combination of means defined in claim 25, and said soap-supply means including an orifice exposed to said rigid tubing means and subjected to the pressure of said water after discharging from said jet means to sense said pressure thereof; said soap-supply means including pressure-transmitter means to transmit said sensing pressure to said soap for causing said automatic soap-discharge in response to said sensing-pressure; and said rigid tubing means including means to retard the velocity of said water flowing through said tubing means before said water reaches said orifice.

43. The combination of means defined in claim 26, and said conduit means comprising rigid-tubing means having an end portion open permanently and including an aperture sufficiently larger than said wand means to enable unrestricted and quick manual insertion thereof into said tubing means by said operator; means communicating with said tubing means to supply continuously a small quantity of water from said conduit means to the area of said brushing means; and soap-supply means operatively associated with said brushing means to discharge soap automatically to the area of said brushing means for mixing with said small quantity of water; and said angle-adjusting means including means to lock said brushing means in any desired angle in relation to said rigid tubing means.

44. The combination of means defined in claim 27, and said soap-supply means including flexible pressure-sensitive means to separate said soap from said impact pressure and to transmit said impact pressure to said soap for effecting said discharge thereof into said water discharging from said jet means; and passage means to conduct said pressurized soap from said pressure-transmitter means to said discharge means.

45. The combination of means defined in claim 28, and said member comprising wand means including a rigid tube portion having said jet means at the end thereof; and said fluid circuit communicating with said wand means to be subjected to said source pressure; means for mounting said soap-supply means on said wand means to be carried thereby; said soap-supply means including flexible pressure-sensitive means enclosing said soap and communicating with said lower circuit-pressure for transmitting same to said soap for causing said feeding thereof to said surface; and said soap-supply means including soap-discharge means mounted on said wand means to discharge said soap into said water discharging from said jet means.

46. The combination of means defined in claim 31, and said means to provide a significantly lower pressure in said passage includes at least two restrictions in series in said passage to provide between said two restrictions said significantly lower pressure; and said means communicating with said passage providing fluid connection therewith at a point between said two restrictions to cause said soap-flow in response to said lower pressure.

47. The combination of means defined in claim 15, and the cleaning process including a washing operation and a rinsing operation; and said member comprising wand means including a rigid tube portion having jet means at the end thereof, and including another portion adapted to be manually held by the operator of said device; brushing means operatively associated with said wand means for loosening the dirt on said surface during said washing operation; attachment means for positively connecting said brushing means directly to said wand means for enabling said last two means to operate as an integral unit during said washing operation; said attachment means including clamping means for enabling said operator to provide or release said positive connection; said jet means being positioned in relation to said brushing means during said operation as an integral unit for directing said water-discharge to an area of said surface adjacent but clear of the area of said brushing means, while said brushing means is moved away from said water-discharge by said operator for performing said rinsing operation simultaneously with said washing operation; and means to direct continuously a small quantity of water to the area of said brushing means for mixing with said soap.

48. The combination of means defined in claim 15, and the cleaning process including a washing operation and a rinsing operation; and said member comprising wand means including a rigid tube portion having jet means at the end thereof, and including another portion adapted to be manually held by the operator of said device; brushing means operatively associated with said wand means for loosening the dirt on said surface during said washing operation; means associated with said jet means for directing said water-discharge to an area of said surface adjacent but clear of the area of said brushing means, while said brushing means is moved away from said water-discharge by said operator for performing said rinsing operation simultaneously with said washing operation; said soap-supply means including a container filled with soap; and pressure-transmitter means associated with said container and communicating with said lower pressure for transmitting same to said soap in said container for causing said feeding of said soap.

49. The combination of means defined in claim 32, and at least said second fluid comprising a liquid; a container for storing said liquid; pressure-transmitting means operatively associated with said container and communicating with said discharge of said first fluid after said jet means for transmitting said impact pressure to said liquid for causing said flow thereof.

50. The combination of means defined in claim 28, and said member comprising wand means including a rigid tube portion having said jet means at the end thereof; and said fluid circuit communicating with said wand means to be subjected to said source pressure; a container for said soap mounted on said wand means and having inlet and outlet ports in series in said circuit between said two restrictions; said circuit including a portion connecting said inlet port with the first of said restrictions to transmit said lower pressure to said soap in said container; said circuit including a second portion connecting said outlet port with the second of said restrictions to discharge said soap in said circuit between said restrictions; said circuit including soap-discharge means mounted on said wand means to conduct said soap from second restriction for discharging into said water discharging from said jet means.

* * * * *